United States Patent [19]
Park et al.

[11] Patent Number: 5,652,065
[45] Date of Patent: Jul. 29, 1997

[54] WOOD VENEERS AND PRODUCTS THEREFROM HAVING ENHANCED STRENGTH AND STIFFNESS

[75] Inventors: David W. Park, Puyallup; Frank R. Hunter, Bellevue; Alkiviadis G. Dimakis, Federal Way, all of Wash.

[73] Assignee: Weyerhaeuser Company, Tacoma, Wash.

[21] Appl. No.: 579,919

[22] Filed: Dec. 28, 1995

Related U.S. Application Data

[63] Continuation of Ser. No. 290,347, Aug. 15, 1994, abandoned.

[51] Int. Cl.$^6$ ....................................................... B32B 9/00
[52] U.S. Cl. .................... 428/537.1; 428/15; 428/106; 428/114; 428/161; 428/212; 428/218; 428/319.7; 428/479.6; 428/481; 428/528; 428/541; 427/317; 264/4.54
[58] Field of Search ..................... 428/106, 161, 428/423.1, 425.1, 464, 537.1, 317.7, 541, 219, 528, 15, 479.6, 481, 114, 319.7, 349; 264/45.4; 427/317

[56] References Cited

U.S. PATENT DOCUMENTS

| | | | |
|---|---|---|---|
| 3,591,448 | 7/1971 | Elmendorf | 161/164 |
| 3,919,017 | 11/1975 | Shoemaker et al. | 156/62.2 |
| 4,606,388 | 8/1986 | Favot | 144/361 |
| 5,140,086 | 8/1992 | Hunter et al. | 527/103 |
| 5,151,238 | 9/1992 | Earl et al. | 264/136 |
| 5,188,707 | 2/1993 | Gordy | 162/11 |
| 5,234,747 | 8/1993 | Walser et al. | 428/215 |
| 5,345,738 | 9/1994 | Dimakis | 52/309.9 |

FOREIGN PATENT DOCUMENTS

| | | |
|---|---|---|
| 937355 | 4/1948 | France . |
| 56-161103 | 12/1981 | Japan . |
| 861347 | 2/1961 | United Kingdom . |
| 1426555 | 3/1976 | United Kingdom . |

*Primary Examiner*—Patrick Ryan
*Assistant Examiner*—Abraham Bahta
*Attorney, Agent, or Firm*—Klarkquist, Sparkman et al.

[57] ABSTRACT

Wood veneers having enhanced strength and/or stiffness, wood products made therefrom, and methods for manufacturing such veneers and wood products are disclosed. A treated veneer having enhanced strength and stiffness has a population of compacted wood cells extending across at least a portion of the length and width dimensions and into the thickness dimension of the veneer to confer an increased density level, and thus increased strength and/or stiffness levels, to the veneer. Interspersed in the compacted wood cells is a non-saturating loading level of a cured rigid thermoset material which maintains compaction of the compacted cells even after prolonged soaking in water. The preferred loading level is just what is required to maintain compaction of the cells. The preferred thermoset material is polyurea which is formed from a polyisocyanate resin applied to at least one major surface of the veneer followed by hot-pressing the veneer. The strength and/or stiffness increase, compared to untreated veneer, is about 10 to 150 percent. Treated veneers can be made into various multiple-ply wood products such as laminated veneer lumber and plywood, thereby providing a way to convert relatively weak lumber from fast-grown trees into premium-grade construction material.

43 Claims, 10 Drawing Sheets

WOOD VENEERS AND PRODUCTS THEREFROM HAVING ENHANCED STRENGTH AND STIFFNESS

This application is a continuation of application Ser. No. 08/290,347, filed on Aug. 15, 1994, now abandoned.

FIELD OF THE INVENTION

This invention pertains to wood veneers and wood products made therefrom having enhanced strength properties.

BACKGROUND OF THE INVENTION

Increasingly widespread utilization of forest resources has led to an increased scarcity of old-growth timber in many parts of the world. This is unfortunate because older trees generally have denser greater percentage of "mature" wood (per unit volume of wood) in older trees relative to "juvenile" wood. Lumber having a greater percentage of mature wood tends to be stronger than lumber having a greater percentage of juvenile wood. This is one reason why old-growth lumber is in such high demand.

As the supply of old-growth timber decreases, more and more lumber is being obtained from trees grown on plantations and similar types of environments in which the trees are urged to reach harvestable size as soon as possible. Because such trees grow so rapidly, the percentage of juvenile wood in them is high relative to mature wood.

Although wood used for construction has any of various standardized width and thickness dimensions, lumber having a higher percentage of juvenile wood is generally structurally weaker than similarly sized lumber having a higher percentage of mature wood. Thus, certain plantation-grown lumber having a high percentage of Juvenile wood is simply not strong enough for certain uses or to comply with construction codes. Of course, it is possible to increase the cross-sectional profile of such lumber to increase strength and stiffness. However, such a remedy is not practical in some instances and not cost-effective in many instances. Thus, as increasing amounts of lumber are produced in plantations and other secondary-growth sources, there is substantial interest in providing ways to enhance the strength and stiffness of such lumber without increasing the physical dimensions of the lumber.

Also, as demand increases for the available supply of timber, a correspondingly greater need arises to exploit all sources of wood and wood fiber. For example, materials previously considered to be "waste," such as sawdust, wood chips, and the like, are now being utilized for making various types of particle board, chip board, laminates, and other useful products. These products are often termed "enhanced" wood products because their composite nature tends to augment certain physical properties compared to ordinary lumber.

One of the earliest such enhanced wood products is a material termed "compreg," described in Report No. 1381 from the Forest Products Laboratory, U.S. Dept. of Agriculture, Forest Service, Madison, Wis. (1955) entitled, "Resin-Treated, Laminated, Compressed Wood (Compreg)". Compreg is made by saturating a wood (such as a wood veneer) with a phenol-formaldehyde resin, then compressing the fully impregnated wood under elevated temperature. The resulting product exhibits certain enhanced physical properties such as improved resistance to moisture absorption, increased hardness, and greater dimensional stability compared to conventional wood. Unfortunately, the amount of resin necessary to saturate the wood renders compreg not economical and/or impractical for many uses, particularly for construction uses.

A number of other methods for enhancing the strength of wood are known in the prior art. However, the products made by such methods have drawbacks that render them unsuitable for certain uses.

Thus, there is a need for ways to modify less dense wood so as to confer on the wood an ability to structurally perform in a manner similar to high-quality old-growth timber, particularly in instances in which the physical dimensions of the lumber, such as thickness, cannot be increased to provide greater mechanical strength or stiffness.

SUMMARY OF THE INVENTION

The foregoing needs are met by the present invention which, according to a first aspect thereof, provides a wood product having enhanced strength and stiffness levels. The product comprises a wood veneer having first and second major surfaces as well as a depth dimension. The veneer is treated so as to have a population of "compacted" (as defined herein) wood cells on at least one major surface and extending into the thickness dimension of the treated veneer. The population of compacted cells confers an increased density, and thus an increased strength and stiffness to, the veneer compared to an otherwise similar but not treated veneer. To maintain the population of cells in a compacted condition, the treated veneer includes a loading level of a cured rigid thermoset material interspersed throughout the population of compacted wood cells. The loading level is non-saturating; i.e., neither the veneer nor the compacted cells are saturated with the thermoset material.

According to another aspect of the present invention, the veneer (which has a length and a width dimension as well as a thickness dimension) is treated so as to have a population of compacted wood cells extending across the length and width dimensions and into the thickness dimension. A cured rigid thermoset material is interspersed throughout the population of compacted wood cells.

According to another aspect of the present invention, the wood veneer is treated so as to have a stratum of compacted wood cells extending across a major surface and into the thickness dimension of the veneer. The cells in the stratum are maintained in the compacted state by a cured rigid thermoset material being interspersed, at a substantially less than saturating level, throughout the cells comprising the stratum.

According to another aspect of the present invention, the wood veneer is not excessively compacted. That is, the veneer is compacted up to a "maximal degree" (as defined herein), which degree represents an amount of compaction above which the veneer would not exhibit an incremental increase in strength and stiffness with a corresponding increase in compaction.

The preferred thermoset material used in veneers treated according to the present invention is polyurea as formed by a curing reaction of a liquid resin comprising polyisocyanate. The most preferred liquid resin used to form polyurea comprises poly(phenylmethane diisocyanate) (abbreviated PMDI).

The liquid resin used to form the thermoset is applied to at least one major surface of the veneer using any suitable method that can achieve a substantially uniform loading level on the portions of the major surface to which the resin is applied. The loading level of the thermoset material is preferably within a range of about 2 to 20 percent w/w relative to a dry mass of the treated veneer. Optimal loading levels will depend upon a number of factors including, inter alia, the species of wood from which the veneer is obtained, the thickness of the veneer, and the percentage of spring wood in the veneer. Either one or both major surfaces of the veneer can be treated. Also, although it is preferred that an entire major surface be treated, some applications of veneers treated according to the present invention may be served by veneers of which only a portion of the major surface is treated.

A veneer treated according to the present invention generally has a density that is up to 30 percent greater than an otherwise similar but untreated veneer. This increased density is accompanied by an increase in mechanical properties such as (but not necessarily limited to) bending modulus of elasticity (bending MOE) and modulus of rupture (MOR) within a general range of about 10 percent to 150 percent relative to otherwise similar but untreated veneers.

According to another aspect of the present invention, veneers treated according to the present invention can be used in the manufacture of various strength-enhanced wood products, including (but not limited to) laminated veneer lumber (LVL) and plywood. Such products can comprise one or more treated veneer plies.

LVL comprising at least one ply treated according to the present invention is particularly advantageous because the resulting LVL having enhanced strength and stiffness can be used in place of conventional construction lumber or wood veneer, thereby providing a construction material that is substantially stronger than natural wood without the need to increase the cross-sectional profile of the product. Treated plies used in such LVL can be made from plantation-grown (i.e., fast-grown) and other low-density lumber that ordinarily would have insufficient strength and stiffness for use as construction lumber.

According to another aspect of the present invention, methods are provided for producing wood products having enhanced strength and stiffness. The methods require treatment of wood veneers that, before treatment, have a "first" (i.e., original) density level, a "first" (i.e., original) strength level, and a "first" (i.e., original) stiffness level. A liquid thermosettable resin is applied to at least a portion of at least one major surface of the veneer. The resin is capable of being absorbed into the wood cells of the veneer and can be cured to form a rigid thermoset material. The resin is applied at a loading level within a readily definable range in which the veneer exhibits a steep increase in relative stiffness with incremental increases in loading level at a particular degree of compaction. (Too much resin destroys a desired wood-like characteristic of the treated veneer and is generally not economical.) Either before, simultaneously with, or (preferably) after applying the resin, the veneer is compacted in the thickness dimension so as to cause the wood cells to undergo a deformation sufficient to reduce the thickness dimension and thus densify the veneer to a density level greater than the first density level and cause an increase in the strength and stiffness of the veneer to levels above the first strength and stiffness levels, respectively. While maintaining compaction of the veneer, the resin is cured to form the rigid thermoset material that retains the deformed condition of the compacted cells.

The foregoing, and other features and advantages of the present invention, will become more apparent from the following description and accompanying drawings.

DETAILED DESCRIPTION

Figure 1:
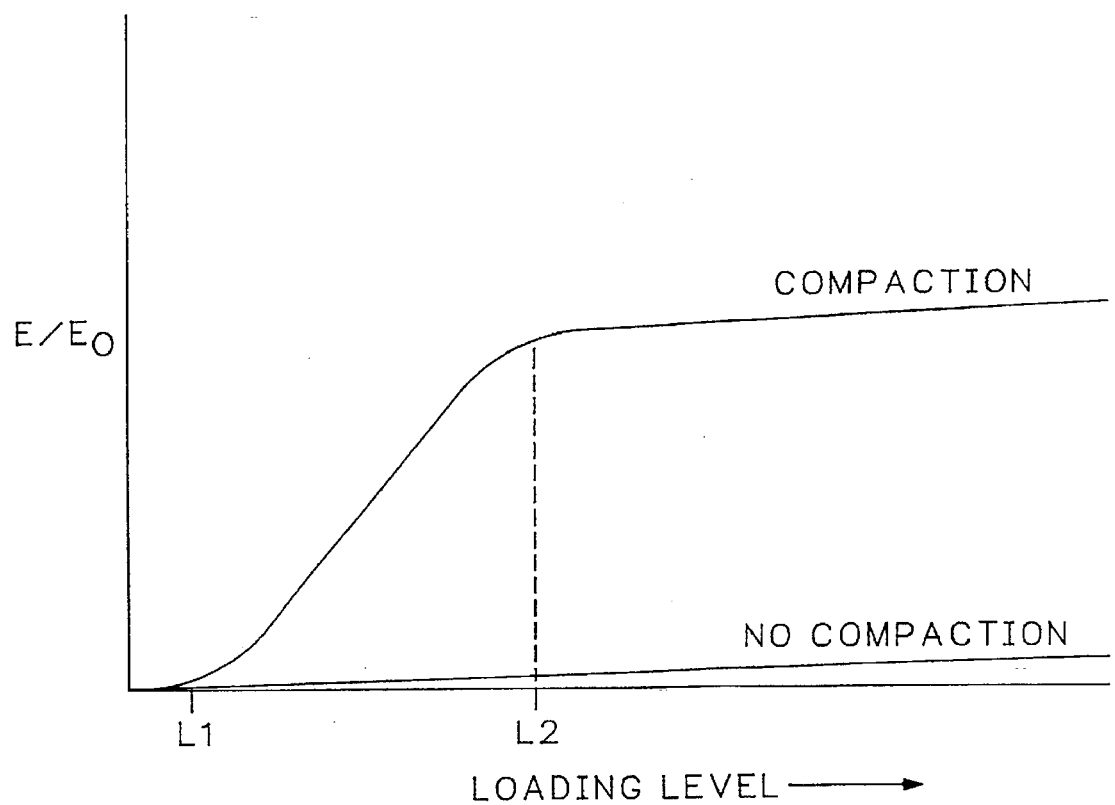
FIG. 1 is a generalized plot showing the surprisingly improved stiffness (measured by relative stiffness $E/E_0$) exhibited by a veneer treated according to the present invention with a combination of resin loading (especially between loading levels L1 and L2) and compaction of the thickness dimension of the veneer.

According to the present invention, wood products having enhanced physical properties are provided. In particular, the present invention provides wood products comprising at least one "treated" veneer.

A "veneer" as used herein is a ply of natural wood obtained from a log or other unit of natural lumber by any suitable means but particularly by rotary peeling or linear slicing. Thus, a veneer has a substantially continuous grain. The permissible thickness range of a veneer can vary depending upon the species of tree from which it was obtained, the intended use of the veneer, and other factors. Veneers can be very thin, such as 1 mm or less, and can approach, in certain instances, about 1 inch in thickness. Generally, however, a veneer tends to be thin in the thickness dimension relative to one or both the length and width dimensions. From a practical standpoint, most veneers tend to have a thickness of ¼ inch or less.

There are no known limits to the tree species from which the veneer is obtained. Since wood characteristics can vary greatly among trees of various species, there may be lower and/or upper thickness limits of veneers obtained from different tree species. In general, thinner veneers (such as 1/6 inch or less) are more practical with most species of wood.

As can be readily appreciated, a veneer has first and second (i.e., obverse and reverse) major surfaces across which extend the length and width dimensions of the veneer. The thickness dimension extends between the perpendicular to the first and second major surfaces.

As used herein, a "treated veneer" is a veneer that has been densified and thus strengthened according to the present invention. The veneer is treated by application of a liquid thermosettable resin to at least one major surface of the veneer. The resin is allowed to penetrate into the thickness dimension of the veneer. Either before, simultaneously with, or (preferably) after application of the resin, the veneer is "compacted," by which is meant the veneer is subjected to a force that reduces the thickness dimension of the veneer without substantially changing the length or width dimensions. Thus, compaction increases the density of the veneer. Compaction can also facilitate penetration of the resin into the thickness dimension of the veneer. (It is not necessary for the resin to penetrate completely through the thickness dimension.) While the veneer is in a compacted condition, the resin in the veneer is cured to form a rigid thermoset material. The cured resin preserves the compaction of the veneer, and thus the increased density, strength, and stiffness of the veneer, even after subsequent prolonged soaking of the treated veneer in water.

A surprising aspect of the present invention is the discovery that maintenance of compaction of the veneer can be achieved by applying appreciably less than a saturating amount of resin to the veneer. (The amount of resin applied to the veneer is termed herein the "loading level.") Preferred loading levels, as described below, are generally much below what would be required to saturate the fibers comprising the veneer with the resin. The loading level is typically expressed as a gravimetric percent (% w/w relative to the "dry mass" of the veneer; i.e., relative to the mass of an otherwise similar veneer to which the resin is not applied).

In addition to having an increased density compared to an otherwise identical but untreated "control" veneer, a treated veneer also exhibits strength properties, such as (but not limited to) bending modulus of elasticity (bending MOE) and modulus of rupture (MOR), that are substantially greater in magnitude than corresponding properties in otherwise identical but untreated control veneers or in control veneers having similar loading levels of the same resin but no compaction.

One illustration of the improvement in mechanical properties of a treated veneer is illustrated in FIG. 1, showing a plot of relative stiffness ($E/E_0$) of a subject veneer versus resin loading level (wherein E is the modulus of elasticity of the subject veneer and $E_0$ is the modulus of elasticity of an otherwise similar control veneer lacking resin or compaction). As shown in the lower plot (labeled "no compaction"), merely increasing the resin loading level of the veneer without compaction produces a resin-laden veneer that exhibits a relatively gradual, substantially linear increase in relative stiffness with increasing loading level. Turning now to the plot designated "compaction," a treated veneer, in contrast, exhibits an initially gradual increase in relative stiffness with increasing loading level up to loading level L1. However, in contrast to the "no compaction" veneer, the compacted veneer exhibits a relative stiffness that begins at loading L1 to rise much more steeply with increasing loading, up to loading L2. Above loading L2, the "compaction" plot becomes substantially parallel to the "no compaction" plot. Thus, treated veneers preferably have a loading level greater than L1. The most preferred range of loading is between L1 and L2 because adding more resin to a level above L2 simply does not yield, in most instances, an incremental increase in strength that would justify the added expense of the additional resin.

Thus, the improved stiffness properties of treated veneers illustrated in FIG. 1 are primarily a result of compaction of the veneer, not principally a result of the presence of cured resin in the veneer.

The present invention is particularly suitable for treating low-density wood such as juvenile wood found in the first 10–15 rings of the tree, or wood found in certain fast-grown trees. Certain plantation softwoods (especially the "southern yellow pine" group of species comprising loblolly, shortleaf, longleaf, slash pine, and virginia pine) are urged to grow and reach harvestable size as soon as possible. As a result, for a given diameter, logs from such trees typically have fewer growth rings (and a correspondingly greater amount of juvenile wood) than older logs (such as from "old-growth" timber) or logs from similar but more slowly grown trees or logs from slower-growing varieties of trees.

Not intended to be limiting, other particularly suitable representative tree species serving as a source of veneer for treatment according to the present invention include aspen, yellow poplar, ponderosa pine, douglas fir, eucalyptus, and radiata pine. In fact, veneer from virtually any species of wood can be used, so long as available equipment is sufficient to achieve a desired degree of densification.

As stated above, the liquid resin is thermosettable, by which is meant a resin comprising polymer molecules that undergo substantial cross-linking reactions under "curing" conditions to form a rigid material that is substantially insoluble in all solvents and that does not exhibit significant melting with increasing temperature. (Exposure of cured thermosets to excessive temperature can cause decomposition or combustion of the thermoset, but such responses to high temperature are not synonymous with melting.)

Candidate thermosettable liquid resins have the following characteristics:

(a) absorb into wood cells;

(b) adhere to but do not penetrate cell walls of wood;

(c) able to retain compaction of wood cells and not exhibit significant swelling or degradation after curing when subsequently exposed to water; and (d) form rigid, not elastomeric, thermosets. Candidate resins preferably have the following additional characteristics:

(a) reactive with residual moisture in wood cells to form the corresponding thermoset;

(b) curable under compaction conditions; and (c) have a viscosity sufficiently high to permit application of the resin to the veneer at a substantially uniform desired loading level yet sufficiently low to readily absorb into wood cells.

With the foregoing general characteristics in mind, it will be appreciated that candidate thermosettable resins can be any of various such resins that form, for example, polyureas, polyethers, polyesters, melamines, acrylics, alkyds, and any of various phenolics. It will also be appreciated that, after becoming familiar with various aspects of the present invention as set forth herein, one would be able to ascertain the suitability of a particular resin by applying the resin to one or both major surfaces of a veneer, then subjecting the veneer to compaction/curing conditions. Unsuitable resins would be readily apparent because of, for example, their inability to absorb into wood or their inability to be compacted or to retain compaction after curing particularly when subjected to water.

Preferably, as stated above, the resin is reactive with water to form the thermoset. Water-reactivity facilitates curing of the resin without an extraneous catalyst because wood normally contains significasignificant amounts of residual moisture. A catalyst can be used, however, if needed or desired, so long as premature curing of the resin can be avoided.

The most preferred thermosettable liquid resin comprises one or more polyisocyanate compounds. Polyisocyanates readily penetrate into wood cells, are available in a wide variety of viscosities, are reactive with water to form a polyurea thermoset, are easy to apply, and confer a greater degree of strength enhancement to treated veneer for a given loading level and degree of compaction than other known resins.

As used herein, a "polyisocyanate" resin is a resin comprising molecules each having at least two isocyanate (—N=C=O) groups. One preferred polyisocyanate is poly (diphenylmethane diisocyanate) ("PMDI"). However, other polyisocyanate compounds can also be used, including, but not limited to, toluene diisocyanate (TDI), 1,6-hexamethylene diisocyanate and "EMDI," an emulsified PMDI formulation that exhibits a more rapid reaction with water than PMDI. Suitable polyisocyanates can also be used in blocked form; i.e., having attached heat-labile substituent groups that inhibit reaction below some specified temperature. Other suitable polyisocyanates include "urethane prepolymers," which are polyols having two or more hydroxyl groups reacted with isocyanate groups for the purpose of modifying the polymer properties such as degree of crosslinking and degree of elasticity, hardness, etc. In general, candidate polyisocyanates are liquid at room temperature, preferably have a viscosity of generally less than 2,000 cps at room temperature, and are preferably economically priced.

For reaction with polyisocyanate resins, the moisture content of the veneer should be at least stoichiometric with respect to the polyisocyanate resin, generally within a range of about 1% to about 10%. The moisture acts as a co-reactant with the polyisocyanate to form polyurea. As is generally understood, wood can contain a substantial amount of moisture and not feel "wet." This is because a large amount of the residual moisture in wood is closely associated with cellulose and lignin molecules in and around wood cells. Suitable dryness of the veneer can be achieved by use of a kiln or oven, air blowers, exposure to a desiccating atmosphere, or analogous means. Although it is seldom required to add sufficient moisture to a veneer for treatment according to the present invention, such moisture addition can be usually be effected by exposing the veneer to a suitably humid atmosphere or to steam.

The liquid resin is applied in liquid form to at least a portion of one or both major surfaces of the veneer. For most applications, the resin is preferably applied to at least one entire major surface. The resin can be applied to the veneer by any suitable method capable of achieving a substantially uniform loading of the resin on the veneer, such as (but not limited to) spraying, gravure coating, curtain coating and roller coating. Vacuum or mild pressure can be employed, if desired, to facilitate penetration of the resin into the veneer. Immersion of the veneer in the resin may be suitable in certain instances (such as when treating thicker veneers), but achieving desired uniform loading levels by immersion can be difficult to control, especially with thinner veneers. (I.e., in many instances immersion and similar methods of application tend to apply too much resin.)

Preferably, the resin is applied to both major surfaces (i.e., to both the obverse and reverse sheet faces of the veneer). Treatment of both major surfaces is particularly advantageous when the veneer will not be incorporated into a multiple-ply wood product. However, treatment of only one major surface may be sufficient, such as in certain instances in which the treated veneer will be incorporated into a multiple-ply wood product such as plywood.

As discussed above, the loading level of resin (or the corresponding thermoset) in the veneer is preferably substantially less than an amount that would saturate the veneer. This is because the thermoset serves to maintain compaction only of those wood cells that experienced any substantial cross-sectional deformation (i.e., partial flattening resulting in densification) during compaction. During compaction, the compaction forces are applied to the veneer that are largely directed perpendicularly to the major surfaces into the thickness dimension of the veneer. Stresses accompanying application of such forces using currently available equipment are normally experienced to the greatest extent by wood cells located on the major surfaces, causing these cells to undergo the greatest deformation. Wood cells deeper in the thickness dimension of the veneer experience progressively less deformation.

Hence, treatment of veneers according to the present invention using currently available equipment is usually a "skin" effect; i.e., a large number of cells within the thickness dimension of most veneers (except extremely thin veneers) do not experience substantial deformation and thus do not require any resin. Usually, the population of wood cells located within 8 to 10 cells of the adjacent major surface experience any measurable deformation. Thus, treating a major surface of a veneer according to the present invention provides at least one surficial "stratum" of compacted wood cells on the major surface, coextensive with the length and width dimensions and extending into the thickness dimension of the veneer (but normally not through the thickness dimension except perhaps when the veneer is extremely thin).

In accordance with the present invention, the loading level is preferably just what would be required to maintain, after curing the resin, the densified condition of the cells in the compacted stratum (i.e., to maintain the treated veneer in a state of "permanent" compaction). Such a loading level does not even "saturate" the compacted stratum. Rather, microscopic examination reveals that the resin tends to become interspersed throughout the population of compacted cells and to coat all or portions of the compacted cell walls of compacted cells without filling all interior and exterior voids in the compacted stratum. Surprisingly, a greater amount of thermoset does not necessarily confer correspondingly greater strength and/or stiffness properties to the veneer. Furthermore, adding more resin would undesirably increase the cost of treated veneer according to the present invention, as well as products made therefrom. Hence, since a "saturating amount" of resin would represent the amount of the corresponding thermoset that would fill all cell lumina and other voids throughout the thickness dimension of the veneer, the loading level in a treated veneer is substantially less than a saturating amount.

The liquid resin is preferably applied in neat form to the veneer; however, the resin can also be diluted with a suitable solvent or viscosity modifier to aid penetration of the resin into the wood cells. Not intended to be limiting, suitable viscosity modifiers, particularly for polyisocyanate resins, include propylene carbonate, dioctylphthalate, and glycerol triacetate. Other viscosity modifiers can also be used and may be more suitable for resins other than polyisocyanate. Whereas viscosity modifiers are not required, their use may be indicated whenever less viscosity of a particular resin is desired or indicated, such as when the ambient temperature is too low.

If required, the amount of solvent or viscosity modifier added to the resin is normally kept low. I.e., any added solvent or viscosity modifier preferably represents a maximum of about 10% w/w relative to the resin so as to avoid swelling of the veneer. Avoidance of swelling prevents unwanted penetration of the resin into the cell walls. Also, use of lesser amounts of or no solvent at all is more economical and poses fewer environmental concerns.

Compaction of the veneer is preferably achieved simultaneously with curing of the resin. Compaction can be performed before, simultaneously with, or after application of the resin. However, pre-compacted wood cells may exhibit an impaired ability to absorb resin. Thus, in most instances, it is preferred to compact the veneer after application of the resin, which may actually facilitate resin absorption.

Compaction is conveniently performed using a platen press, belt press (continuous press), or analogous device that applies forces normal (i.e., substantially perpendicular) to the major surfaces of the veneer so as to reduce the thickness dimension of the veneer. Passing the veneer through rollers in the manner of a calender, in an attempt to achieve compaction of the veneer, has been found to be unsatisfactory in most instances. Calender rollers typically apply a compressive force only along a line extending across the width of the veneer, which tends to displace the cells of the wood passing between the rollers laterally rather than compacting the cells. The more effective, and thus the preferable, way of achieving compaction of a veneer is to simultaneously subject at least substantial portions of the major surfaces (most preferably the entire major surfaces or at least those portions of the major surface(s) to which resin was or will be applied) of the veneer to compression. In the foregoing context, "substantial portion" means a greater amount of the major surfaces than would be subjected to compression by passing the veneer through a calender.

Suitable loading levels typically range from 2 to 20 percent w/w (so long as such levels are not saturating), depending mainly upon the species of wood from which the veneer was obtained, the density and thickness of the untreated veneer, the particular resin used, the viscosity of the resin, the temperature of the resin and of the veneer, the hydrophilicity of the resin, and the mean molecular weight of the polymer molecules comprising the resin. In general, veneers having a greater percentage of early wood are less dense and tend to absorb greater amounts of resin (i.e., they tend to accommodate greater loading levels). Thus, for example, veneers made from plantation-grown "southern yellow pine" typically require loading levels at or near the maximum of the foregoing range. Veneers treated with loading levels less than about 2 percent generally exhibit an unacceptable degree of spring-back when the treated veneer is subjected to a water-soaking test. Loading levels greater than about 20 percent generally represent more resin than is necessary to confer the improved structural strength and/or stiffness to the treated veneer; i.e., loading levels greater than about 20 percent are not economical. Also, excessive amounts of resin can fill too many voids in the compacted strata and cause an undesirable expulsion of resin from the veneer during compaction, which can result in a need for frequent cleaning of or damage to the compaction device. Thus, it is preferred that the loading level be sufficiently low to prevent expulsion of resin from the veneer during compaction and/or curing.

When applied to the veneer at a loading level within the foregoing range, the resin absorbs into the wood rather than remaining on the wood surface in the manner of a glue. Such absorption normally occurs satisfactorily at room temperature, but can be aided by elevating the temperature. During absorption, the resin enters wood cells including the wood cells that experience deformation as a result of compaction. The resin preferably coats all or part of the walls of such cells. Upon curing of the resin in the compacted veneer, the resulting thermoset prevents the cells from experiencing substantial "spring-back" (i.e., rebound expansion in the thickness dimension) even after being soaked in water for hours.

During application of pressure so as to achieve compaction of the veneer, it is important that the compressive force not be excessive, by which is meant a force that causes crushing or complete flattening of wood cells (i.e., a force that compresses the veneer beyond the elastic limit of the veneer. Complete flattening of wood cells, as well as cell destruction, can cause a marked decrease in the strength of the veneer that cannot be rectified by the presence of the thermoset.) That is, a wood veneer is made up of countless substantially tubular wood cells that inherently have high strength both individually and collectively. Thus, it will be appreciated that flattening of wood cells sufficiently to destroy their lumina or disintegrate their cell walls destroys the fundament of wood strength. The "maximal" degree of compaction represents an amount of compaction at about the elastic limit of the veneer, above which the veneer does not exhibit an incremental increase in strength and/or stiffness with a corresponding increase in compaction. Rather, increasing the degree of compaction above the maximal level can cause the veneer to substantially lose strength and/or stiffness.

Veneers containing a high percentage of early wood generally exhibit more compaction upon application of a particular compressive force than veneers containing a higher percentage of late wood. Plantation-grown conifer softwood veneers can experience a maximal degree of compaction representing as much as a thirty percent reduction in the thickness dimension. Certain other veneers, such as tropical softwoods, may tolerate an even higher maximal level. Many other woods cannot tolerate even 30-percent compaction without experiencing substantial loss of strength. In any event, it will be appreciated that veneers from different species of wood, as well as veneers containing various amounts of early wood relative to late wood, will exhibit different maximal degrees of compression.

Similarly, the "maximal loading level" for a particular degree of compaction is the level above which incremental increases in veneer strength and stiffness observed at corresponding increases in loading levels are not observed. This is because, as stated above, the surprising benefit of thermosets such as polyurea arises from the role of the thermoset in maintaining compaction of wood cells, not from the presence of the thermoset in the veneer. Increasing the amount of thermoset up to a "saturation level" (i.e., a level at which all voids in the veneer are occupied by resin)

simply does not achieve a correspondingly greater degree of strength and stiffness enhancement.

A "minimal loading level" of resin is the smallest amount of resin, per unit area, that when applied to the veneer will not allow the treated veneer to exhibit significant springback (i.e., loss of densification) even after a 24-hour soaking in water at room temperature. A simple soak test will confirm whether or not a particular loading level is adequate for a particular veneer and for a particular degree of compaction to maintain the permanency of the compaction.

After applying the polyisocyanate resin to the veneer, the resin is cured. Curing can occur spontaneously at room temperature, but considerable amounts of time (e.g., days) is often required to achieve a complete cure by this method. In general, curing rate is directly related to curing temperature. Thus, the veneer is preferably heated after applying the resin; most preferably subjected to both heat and pressure. In fact, compaction of the veneer as discussed above can occur (and preferably does occur) simultaneously with curing the resin. Application of heat and pressure also aids penetrainon of the resin into wood cells located at and near the two major surfaces of the veneer.

Compaction/curing is preferably conducted at a pressure sufficient to achieve the desired degree of thickness reduction (i.e., densification). Higher pressures should be avoided. The same general rule applies for curing temperature, which is preferably no higher than what is required to achieve a satisfactory cure of the resin within the desired length of time. It will be appreciated that different veneer species and thicknesses, and different resin types, as well as other factors, will dictate curing temperature and time. By way of example and not intended to be limiting, a preferred general temperature range for curing many polyisocyanates is about 250° F. to about 400° F. Nevertheless, a skilled artisan, after becoming familiar with the general principles of the present invention as set forth herein, would be able to readily optimize curing conditions for a particular type of veneer, resin, degree of compaction, and desired product thickness.

It will also be appreciated that thicker veneers (or layups of multiple veneers) will require a longer time in which to achieve full cure than otherwise similar, albeit thinner, veneers.

Although polyisocyanates can react with hydroxyl groups, such as on cellulose and lignin molecules, to form urethane (carbamate) linkages, polyisocyanate resins used according to the present invention appear to preferentially react with water molecules because substantially no urethane peaks are observed in IR spectra of veneers treated using polyisocyanates. Thus, it is unclear whether curing the polyisocyanate actually results in covalent bonding of the resulting polyurea to the wood cells in treated veneers.

Treated veneers according to the present invention generally exhibit an improvement in strength and stiffness properties, over untreated veneers, of about 10 to about 150%, usually 50–100%. Even after subsequent water soaking, the strength and stiffness increase is largely preserved. Representative strength properties include modulus of elasticity (MOE), modulus of rupture (MOR), and tensile strength. The same degree of improvement is not necessarily exhibited in all three parameters.

The present invention also comprehends wood products comprising multiple veneer plies wherein at least one of the plies is a treated veneer. For example, the present invention comprehends "Laminated Veneer Lumber" (abbreviated "LVL") and plywood comprising at least one treated veneer. In LVL, the grain of each veneer ply is oriented substantially parallel to the adjacent veneer. In plywood, the grain of at least one veneer ply is oriented substantially perpendicularly to the grain of an adjacent veneer. A treated veneer, when made into plywood, LVL, or other multiple-ply wood product, confers increased strength properties to the wood product, compared to an otherwise similar wood product lacking the treated veneer. The treated veneer can be an "outer ply" (i.e., a ply defining either of the two major surfaces of the product) or an "inner ply" (a ply situated between the outer plies in plywood or LVL consisting of more than two plies).

When manufacturing plywood or LVL from multiple veneers treated according to the present invention, it is possible to either lay up pre-cured (i.e., cured and compacted) veneers or lay up some or all the veneers before curing them. Different inter-ply adhesives may need to be used, depending upon whether or not the veneers are precured. For example, veneers treated with polyurea do not adhere well to phenolic adhesives; a polyisocyanate adhesive is indicated in such instances.

Whereas plywood comprising at least one treated veneer is particularly suitable for use in a conventional sheet form, LVL comprising at least one treated veneer has particular utility as an alternative to natural lumber. For example, LVL comprising multiple treated veneers can be readily produced having a cross-sectional profile similar to conventional "2×4", "2×6", "2×8" or other standard construction lumber. The treated veneers (and any untreated, veneers, if desired) comprising the LVL can be made from low-density plantation-grown wood normally having insufficient mechanical strength for use as natural construction lumber.

Thus, wood products such as LVL having at least one treated veneer provide a way, heretofore not possible, to enhance the strength and stiffness properties of low-density wood and thus open up previously closed markets for such wood. Importantly for many applications, wood products comprising veneers treated according to the present invention still have an appearance similar to natural wood and can be used in place of natural wood, in contrast to conventional "enhanced" wood products having significantly higher loading levels of resin.

Figure 2:
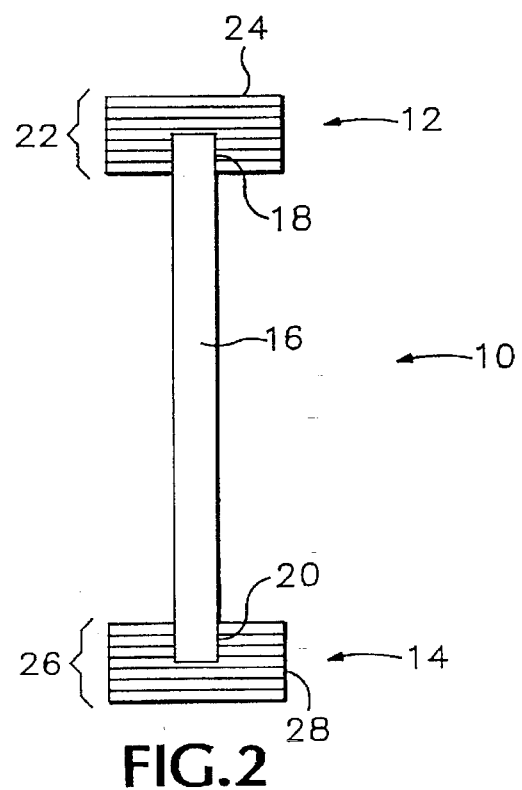
FIG. 2 is an end view of an I-profile manufactured joist in which the upper and lower flanges are laminated veneer lumber comprising at least one treated veneer according to the present invention.

LVL comprising at least one treated veneer and having a cross-sectional profile similar to natural construction lumber can be used wherever construction lumber is used. Similarly, plywood comprising at least one treated veneer can be used in place of conventional plywood. Such uses of LVL and plywood comprising at least one treated veneer include any of various "engineered" wood products such as, but not limited to, trusses, joists, studs, forms, and beams. A particularly notable use for LVL members comprising at least one treated veneer is in a manufactured joist as depicted in FIG. 2. The joist 10 of FIG. 2 (end-view shown) comprises an upper LVL flange 12, a lower LVL flange 14, and a web 16 that can be made of natural lumber; a conventional wood product termed "oriented-strand board" or "flake board"; or of conventional plywood or LVL. Each LVL flange 12, 14 is provided with a longitudinal slot 18, 20, respectively, into which a corresponding lateral edge of the web 16 is inserted and adhered. The upper LVL flange 12 comprises multiple veneers 22 adhered together, of which at least one veneer 24 is treated according to the present invention. Likewise, the lower LVL flange 14 comprises multiple veneers 26 adhered together, of which at least one veneer 26 is treated according to the present invention. For maximal strength of the joist 10, the treated veneers 24, 28 are situated as far apart from each other as possible. Although the flanges 12, 14 are shown having treated veneers on only one major surface of each flange, it is possible for one or more treated veneers to be situated on both major surfaces of each flange. It is also possible for all the veneers of each LVL flange to be treated. In any event, by using LVL flanges instead of natural lumber in manufactured joists as shown in FIG. 2, substantially stronger and stiffer joists can be made without significantly increasing the amount of wood from which the joist is made. The LVL flanges of joists as shown in FIG. 2 can also be made using treated veneers obtained from low-density plantation-grown timber that normally would have insufficient strength for such uses, and at a cost substantially no higher than of the flanges (or the entire joist itself) were made using natural old-growth lumber.

In order to further illustrate the invention, the following examples are provided.

EXAMPLE 1

This Example shows the effect on veneer compaction and MOE when untreated veneer is hot-pressed, then soaked in water for 24 hours, then equilibrated with a 50-% relative humidity (RH) atmosphere.

Samples of Southern Yellow Pine veneer, each being 12 inches wide and 12 inches long, and each having an initial thickness of 0.12 to 0.13 inch (nominally ⅛ inch) were hot-pressed using a 2 ft.×2 ft. platen press. The spacing between the platens was adjustable (with stops) so as to enable a desired degree of compression to be attained. The press temperature was 370° F. Each veneer remained in the press for 60 seconds.

The density of each veneer was measured and the bending MOE was non-destructively measured prior to compression, after compression but before soaking in water, then again after the water soak in order to determine the degree of compaction following each step. After water soaking, the veneers were equilibrated at 50-% RH (relative humidity) before testing.

Figure 3:
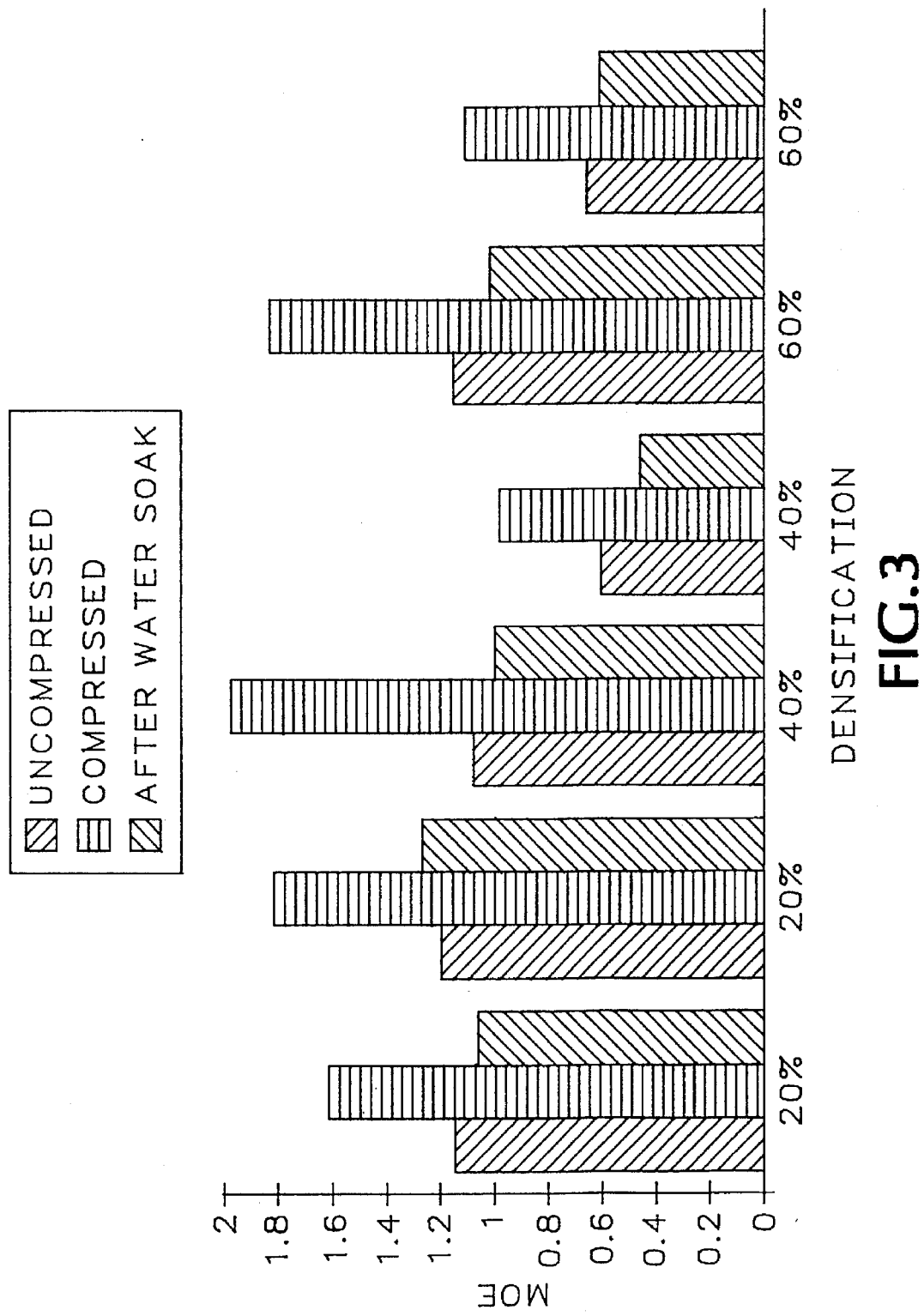
FIG. 3 is a bar-graph of certain data set forth in Table 1 (Example 1) showing that, in veneers that have been hot-pressed to achieve compaction but have received no resin, compaction is lost after subsequent water soaking.

Bending MOE and density data for six veneer panels (A–F) are summarized in Table 1. Panels A and F were given a relatively low amount of compaction by using 0.1-inch stops in the press (resulting in a compaction of about 20 percent); panels D and E were given a moderate degree of compaction by using 0.075-inch stops (resulting in a compaction of about 40 percent), and panels B and C were given a high degree of compaction by using 0.05-inch stops (resulting in a compaction of about 60 percent). Table 1 also includes data pertaining to the percent change in bending MOE after water soaking compared to corresponding initial bending MOE data for non-compacted panels.

values were lost after the 24-hour water soak. These results are illustrated in bar-graph form in FIG. 3.

EXAMPLE 2

This Example investigates how increases in veneer stiffness are related to the degrees to which the veneer is compacted during treatment using resin loading levels less than 5 percent.

Five veneer specimens (southern yellow pine) were investigated, each being 12 inches in width and 12 inches in length, and each having an initial (untreated) thickness of nominally ⅛ inch. About 3 grams of PMDI resin ("PAPI 20," from Dow Chemical Co., and having a viscosity of 2000 cps at room temperature) was applied to each major surface of each veneer specimen using a "hand proofer" (roller coater), yielding a total loading level of less than 5 percent (range of 3 to 4.6 percent). (The hand proofer comprised one embossed steel metering roller and one rubber roller. The resin is initially applied to the veneer between the rollers and then spread over the major surface of the veneer by contact with the rubber roller.) The resin was allowed to penetrate into the major surfaces of the veneers.

After application of the resin, the panels were subjected to heat and pressure using a 2 ft.×2 ft. platen press so as to both achieve compaction of the veneer and curing of the resin. The spacing between the platens was adjustable so as to enable a desired degree of compaction to be attained. ("Jack ram" means that the veneer was subjected only to a minimal compaction resulting from placing the veneer between the top and bottom platens and allowing the top platen to rest with its full weight atop the veneer.) The press temperature was 370° F. Each veneer remained in the press for 60 seconds. Wire caul plates were placed between the platens and the veneer to allow excess moisture to escape from the press during curing without the need for "breathing" cycles (periodic releases of pressure during curing to allow accumulated vapor to escape). Also, silicone-treated release paper (from James River Corp.) was used to prevent any isocyanate from adhering to the caul plates.

After treatment, each veneer was subjected to non-destructive bending MOE testing before and after a 24-hour water soak in order to determine the degree to which compaction was retained after the water soak.

Data showing an increase in density and bending MOE as a result of the treatment of these veneers are shown in Table 2. Each of the stated values represents a mean of data

TABLE 1

| VENEER | INITIAL DENSITY | INITIAL MOE | DENSITY COMPRESSED - NO SOAKING | MOE COMPRESSED - NO SOAKING | DENSITY AFTER SOAKING | MOE AFTER SOAKING | % MOE CHANGE AFTER SOAKING |
| --- | --- | --- | --- | --- | --- | --- | --- |
| A | 27.7 | 1.14 | 33.5 | 1.62 | 28.69 | 1.07 | −6.1 |
| B | 29.4 | 1.08 | 44.8 | 1.98 | 31.98 | 1.00 | −7.4 |
| C | 30.4 | 1.15 | 41.8 | 1.94 | 31.37 | 1.03 | −10.4 |
| D | 27.9 | 0.65 | 35.8 | 1.11 | 29.25 | 0.61 | −6.2 |
| E | 26.5 | 0.61 | 37.2 | 0.99 | 27.31 | 0.41 | −23.0 |
| F | 28.9 | 1.2 | 36.7 | 1.82 | 31.57 | 1.27 | +5.8 |

Table 1 shows that, whereas compaction of veneers (by hot-pressing) increased the density and bending MOE values of the veneers, the increased densities and bending MOE obtained with five identically treated veneers. Data are expressed as "% change" values relative to corresponding values obtained before treatment.

TABLE 2

| COMPRESSION CONDITION | VALUES PRIOR TO SOAKING | | VALUES AFTER SOAKING | |
|---|---|---|---|---|
| | % DENSITY CHANGE | % MOE CHANGE | % DENSITY CHANGE | % MOE CHANGE |
| JACK RAM | 7.89 | 21.89 | 6.96 | 11.1 |
| 0.1 INCH STOPS | 29.17 | 74.49 | 22.5 | 52.3 |
| 0.075 INCH STOPS | 54.87 | 99.9 | 31.1 | 25.5 |

According to the data in Table 2, the treated veneers retained, after soaking, a substantial proportion of the increased density and stiffness imparted by the treatment. Soaking did cause some decrease in density and bending MOE, suggesting that the particular loading levels of resin used with these veneers in this Example were insufficient for retaining the full amount of compaction imparted by the treatment.

EXAMPLE 3

This Example shows the effect of slightly increased loading levels of resin compared with the veneers treated in Example 2.

Figure 4:
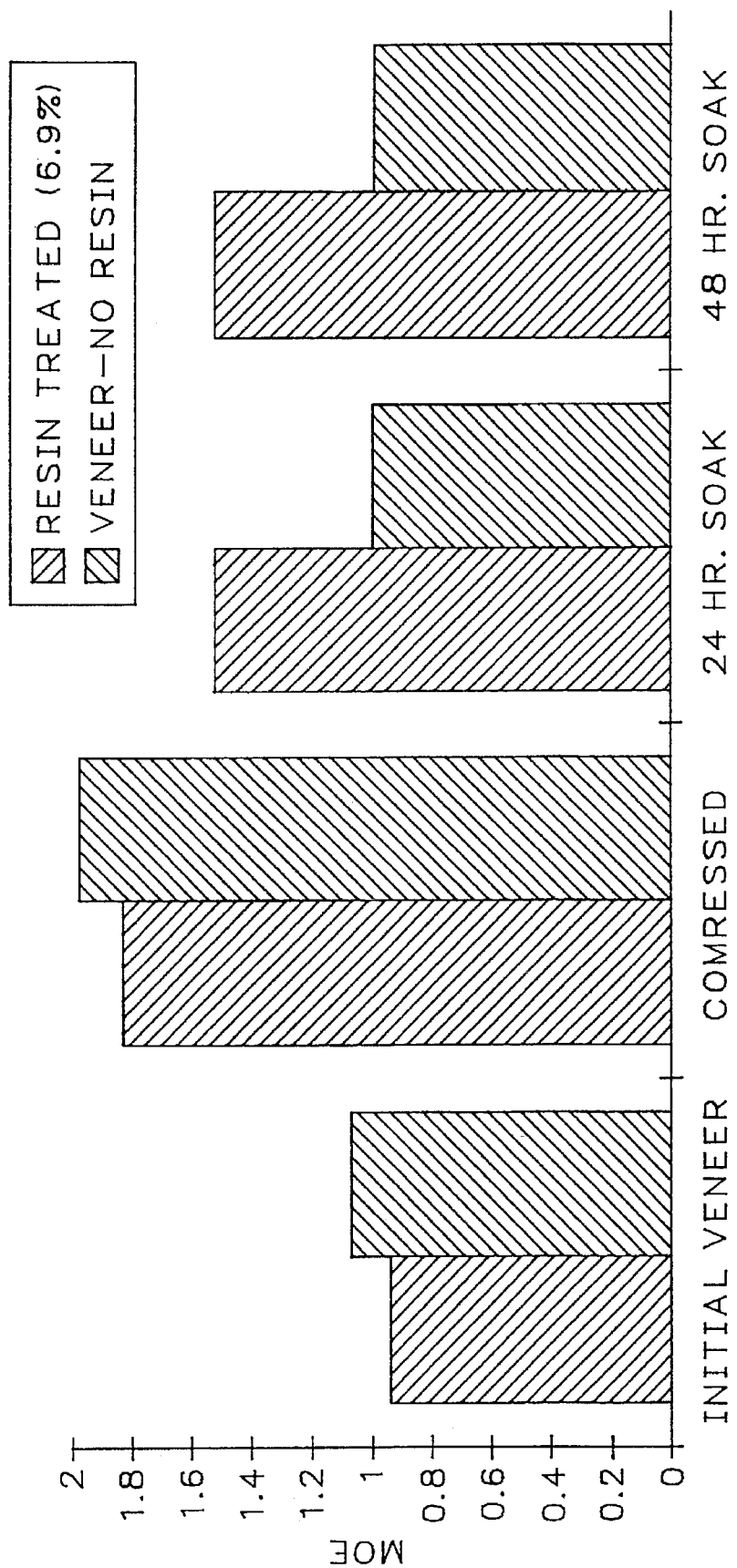
FIG. 4 is a bar-graph of certain data set forth in Table 3 (Example 3) showing that veneers treated according to the present invention retain, even after prolonged post-treatment soaking in water, at least most of the enhanced strength and stiffness (measured as increased bending MOE) conferred by the treatment.

Three veneers (5-year old southern yellow pine) having length and width dimensions of 12 inches and an original nominal thickness of ⅛ inch (range 0.121 to 0.126 inch) were evaluated. The veneers were subjected to MOE testing using standard methods. "PAPI 20" PMDI resin was applied to both major surfaces of the veneers, using the technique described in Example 2, yielding a total loading level of 6 percent (range 5.5 to 7 percent). The veneers were compacted during curing using 0.075-inch stops in the platen press; and curing conditions were as described in Example 2. After curing, bending MOE measurements were obtained. The treated veneers were then soaked in water at 50° F. for 24 hours, then re-subjected to bending MOE testing. Results (mean values; n=3) are set forth in Table 3 and illustrated in bar-graph form in FIG. 4.

TABLE 3

| VENEER | INITIAL MOE | MOE - COMPRESSED BUT NOT SOAKED | MOE - COMPRESSED & SOAKED | % MOE INCREASE AFTER SOAK |
|---|---|---|---|---|
| A | 1.11 | 2.24 | 1.8 | 62.2 |
| B | 1.11 | 2.01 | 1.84 | 65.7 |
| C | 0.94 | 1.83 | 1.52 | 61.7 |

The foregoing results indicate that treatment of the veneers doubled their stiffness and that the treated veneers retained most of their enhanced stiffness even after prolonged water soaking.

EXAMPLE 4

In this Example, a veneer treated using a "high-viscosity" polyisocyanate resin was compared with a veneer treated with a "low-viscosity" polyisocyanate resin.

The "high-viscosity" resin was PAPI 20 (2000 cps at room temperature); and the "low-viscosity" resin was PAPI 901 (250 cps at room temperature), both from the Dow Chemical Co.

To obtain data for strength comparisons, each veneer, before treatment, was subjected to bending MOE testing using standard methods.

Each resin was applied to five separate veneers measuring 12 inches by 12 inches by nominally ⅛-inch thick (range 0.123–0.127 inch for the five veneers treated with PAPI 20, and range 0.118 to 0.129 inch for the five veneers treated with PAPI 901). Six grams of resin were applied to only one side (the "knife" side) of each veneer, yielding a loading level of about 4%. Each veneer was then compacted to a thickness of 0.075 inch, yielding thickness reductions of 24 to 32 percent for the PAPI 20-treated veneers and 28 to 32 percent for the PAPI 901-treated veneers. Curing conditions were as described in Example 2.

The veneers treated with PAPI 20 exhibited an 88.85 percent increase in bending MOE after treatment compared to before treatment. The veneers treated with PAPI 901 exhibited a 79.21 percent increase in bending MOE after treatment compared to before treatment.

These results indicate that both "low-viscosity" and "high viscosity" polyisocyanate resins are effective for producing a substantial strength and stiffness increase of the veneers. However, these southern yellow pine veneers are relatively porous to polyisocyanate resin relative to veneers obtained from denser wood. The higher viscosity PAPI 20 resin is easier to apply to these veneers at a controlled and uniform loading level because of the slower rate at which this resin is absorbed into the veneer.

The treated veneers were then soaked in water (about 50° F.) for 24 hours. Post-soak thickness measurements indicated that the veneers had regained most of their initial (pre-treatment) thickness. These results indicate that treating veneers on one side only may be an insufficient treatment if the veneers will experience significant post-treatment exposure to water.

EXAMPLE 5

This Example is a comparison of the effect of different resin loading levels on veneers that were subjected to the same degree of compaction.

The veneers (n=8) were of juvenile southern yellow pine, measuring 12 inches long by 12 inches wide by nominally ⅛-inch thick. Before treatment, each veneer was subjected to bending MOE testing using standard methods. A first set of twelve veneers received a 4-percent loading level of PAPI 20 (applied to both major surfaces) and second set of twelve veneers received a 10 percent loading level of PAPI 20 (applied to both major surfaces).

In each set, four veneers received zero compaction, four received 15% compaction, and four received 30% compaction. After treatment, all veneers were subjected again to bending MOE testing. Results are presented in Table 4, wherein each value is a mean of four samples and is expressed as a percent increase in stiffness relative to untreated veneers.

TABLE 4

| | Percent Compaction | | |
|---|---|---|---|
| Loading | 0 | 15 | 30 |
| 4% | 31% | 79.1% | 81% |
| 10% | 31% | 70.3% | 118% |

Thus, compaction in combination with resin loading increases the stiffness of these veneers.

EXAMPLE 6

This Example is an investigation of the effect of substituting the polyisocyanate resin with a saturating phenolic impregnating resin; i.e., an investigation of the effects of using a different type of resin. The phenolic resin used here was saturating which was expected to exhibit substantially complete penetration into the thickness dimension of the veneer, probably into cell walls. (Of the large number of phenolics that exist, many have high viscosity and thus exhibit a poor ability to penetrate into the veneer.)

The subject veneers were of southern yellow pine, each being 12 inches wide, 12 inches long, and nominally ⅙-inch thick. Before applying resin, bending MOE values were determined for each veneer.

For the phenolic resin, two loading levels were investigated: 4.3% and 8.5% (applied to both major surfaces of separate veneers). After applying the phenolic resin to the veneers, the veneers were compacted to 0.10 inch (about 30% reduction in thickness) using a platen press at 330°–370° F. for 1–2 min. After removal of the veneers from the platen press, thickness and bending MOE measurements were obtained. Then, the veneers were soaked in water for 24 hours at about 50° F. after which bending MOE measurements were again obtained. The results are shown in Table 5, wherein the values represent percent thickness reductions compared to pre-compaction thickness:

TABLE 5

| Load | % Reduction Thickness | Init. MOE | Post-Treat MOE | Post-Soak MOE |
|---|---|---|---|---|
| 4.3% | 26.16% | 0.65 | 0.71 | 0.65 |
| 8.5% | 18.24% | 0.32 | 0.37 | 0.36 |

Thus, the veneers treated with phenolic resin exhibited a small degree of stiffness enhancement at the loading levels and compaction conditions used in this Example. The phenolic-treated veneers also exhibited significant springback after compaction and curing of the resin. Finally, the phenolic resin was observed to penetrate less readily into the thickness dimension of the veneer compared to polyisocyanate resin.

EXAMPLE 7

In this Example, two plywood panels (designated Panel A and Panel B) each comprising veneers treated according to the present invention were prepared and evaluated. Each plywood panel consisted of five veneers; the two outer veneers were provided in Example 6 and were thus treated before laying up the plies; the three inner veneers were conventional untreated veneers. The veneers were of southern yellow pine and had the following thicknesses (top to bottom, dimensions in inches):

Panel A: 0.10; 0.132; 0.119; 0.131; 0.090

Panel B: 0.083; 0.125; 0.126; 0.124; 0.087

A phenolic adhesive applied at 20 g/ft.² at the glue line (10 g/ft² per face) was used to adhere the veneers together. The adhesive was cured by heating each laid-up stack of five veneers at 330° F. and 200 psi for 10 minutes. The panels were then "conditioned" by storage at room temperature, 50% relative humidity, for 7 days.

Based upon calculated values, the bending MOE of otherwise similar plywood panels made entirely of untreated veneers was expected to have a value of 0.78. Panels A and B, in which the outer plies were treated veneers, were expected, based upon calculated values, to exhibit bending MOE values of about 1.37. The actual bending MOE values of Panels A and B were substantially higher: 1.54 and 1.45, respectively.

Thus, using treated veneers to produce plywood yields a plywood product with substantially improved stiffness characteristics.

EXAMPLE 8

In this Example, two 4-ply LVL panels were produced and evaluated. The two outer plies were veneers treated according to the present invention. The two inner plies were conventional veneers. Each veneer was of southern yellow pine, nominally ⅙-inch thick (untreated thickness). For each panel, a comparison was made of calculated (i.e., "predicted") versus actual stiffness values exhibited by the panel.

Each panel prepared had four veneers. The two outer veneers were treated; the two inner veneers were conventional untreated veneers.

In treating the outer plies, PAPI 20 was applied at 4-percent loading to each major surface (8 percent loading total). The plies were then laid up with conventional phenolic adhesive therebetween. Simultaneous curing of the adhesive and compaction of the outer veneers was performed at 345° F., 200 psi, for 10 minutes.

The calculated bending MOE values for panels similar to the above but made entirely from untreated veneers are (based upon characteristics of the individual veneers): Panel A: 0.97; Panel B: 0.96.

The calculated bending MOE values for Panels A and B are: Panel A: 1.56; Panel B: 1.54

Actual bending MOE values were determined to be: Panel A: 1.5; Panel B: 1.69

Thus, it is possible to produce LVL, in which the outer plies are treated according to the present invention, wherein curing of the adhesive and compaction of the treated veneers is performed in a single step.

It was observed that the degree of veneer densification achieved in such a single-step process is not as great as achieved when the treated veneers are compacted before adhering together all the veneers in the LVL. Increasing the moisture content of the veneers could increase the maximal amount of compaction.

EXAMPLE 9

In this Example, various techniques for applying polyisocyanate resin to veneer were investigated. The following techniques were evaluated:

(a) submerging the veneer in resin in a vessel while lowering the pressure in the vessel to a subatmospheric level, thereby facilitating penetration of the resin into the wood cells;

(b) applying the resin to the major surface(s) of the veneer using a hand proofer, wherein the resin is allowed to absorb naturally into the veneer;

(c) applying the resin to the major surface(s) of the veneer using a "foam paint brush", wherein the resin is allowed to absorb naturally into the veneer;

(d) under hot or cold (room temperature) conditions, momentarily pre-pressurizing the veneer to reduce voids in the wood before applying the resin, then releasing the pressure; the resulting re-expansion of the veneer facilities absorption of the veneer into the wood cells;

(e) leaving a "border" to which resin is not applied around the perimeter of each major surface of the veneer to absorb any resin expelled from the veneer during compaction of the veneer; and (f) applying the resin using a sprayer.

Method (a) was found to generally result in excessive loading levels of resin (about 30 percent or more) and the loading level was difficult to control. Thus, method (a) is not preferred, particularly with thinner veneers. Methods (b), (c), and (f) provided the best control and greatest uniformity of resin application, particularly at desirable low loading levels. It can be difficult to achieve uniform loading using method (b) with a veneer having an extremely rough major surface, particularly with low-viscosity resins; method (c) or use of higher viscosity resin may be indicated in such instances. Method (e) works well, but an untreated border produces waste material which can adversely affect the economy of this method. Method (f) can be difficult to perform using more viscous resins.

Two treated veneers (southern yellow pine; 12×12×⅛ inch; samples A and B) were produced using method (a). Overall loading levels were about 30 percent using PAPI 901 resin containing 10% propylene carbonate. Compaction/curing conditions were 365° F., 800 psi, 60 seconds. For controls, an untreated veneer and a veneer that received no resin but was subjected to the compaction/curing conditions were also evaluated. All veneers were tested to determine their density, MOR, and bending MOE values, as well as their water-absorption and re-swelling behavior after water soaking. Results are set forth in Table 6.

TABLE 6

| SAMPLE | DENSITY (PCF) | MOR (PSI) | MOE (PSI) | WATER ABS (%) | THICK SWELL (%) |
|---|---|---|---|---|---|
| CONTROL | 37.2 | 12400 | 1.04 × 10⁶ | 53 | 3.3 |
| PRESSED; NO RESIN TREATMENT | 49.7 | 19520 | 2.06 | 97.7 | 56 |
| SAMPLE A | 63.3 | 26470 | 2.94 | 11.9 | 5.0 |
| SAMPLE B | 59.9 | 25220 | 1.96 | 13.1 | 6.4 |

As shown in Table 6, Samples A and B exhibit substantial improvements in (i.e., at least a doubling of) stiffness and MOR compared to the untreated control. The veneer that was compacted but received no resin also showed significant increases in strength, stiffness, and density compared to the untreated control, thus indicating that increasing the density of a veneer yields a corresponding increase in strength and stiffness. Table 6 also indicates that the presence of resin (Samples A and B) provides strength and stiffness enhancements to the veneer as well as a density increase, compared to the untreated control. However, whereas Samples A and B are largely resistant to water absorption and swelling as a result of the presence of polyurea, the veneer that was compacted without resin experienced substantial absorption of water and swelling during water soaking.

Although Samples A and B exhibited desirable characteristics of improved strength, stiffness retention of compaction, and resistance to spring-back during water soaking, the method used for applying the resin to the veneers in these Samples resulted in a loading level (30%) that was higher than needed to achieve the characteristics. Lower loading levels were very difficult to achieve with these particular veneers using this method for applying the resin. Thus, this method is not the most desirable from an economics perspective.

Additional veneer samples as described above were treated with polyisocyanate resin using a foam brush for applying the resin before compaction/curing. (Compaction/curing conditions as set forth above.) The polyurea loading levels after curing were determined to be 4.0, 6.5, and 8.3 percent (4 veneer samples per loading level). Bending MOE, tensile strength, hardness (modified Rockwell), and water absorption tests were performed on these samples. Results are shown in FIGS. 5–7, along with similar data for otherwise similar but untreated veneers (zero percent loading).

Figure 5:
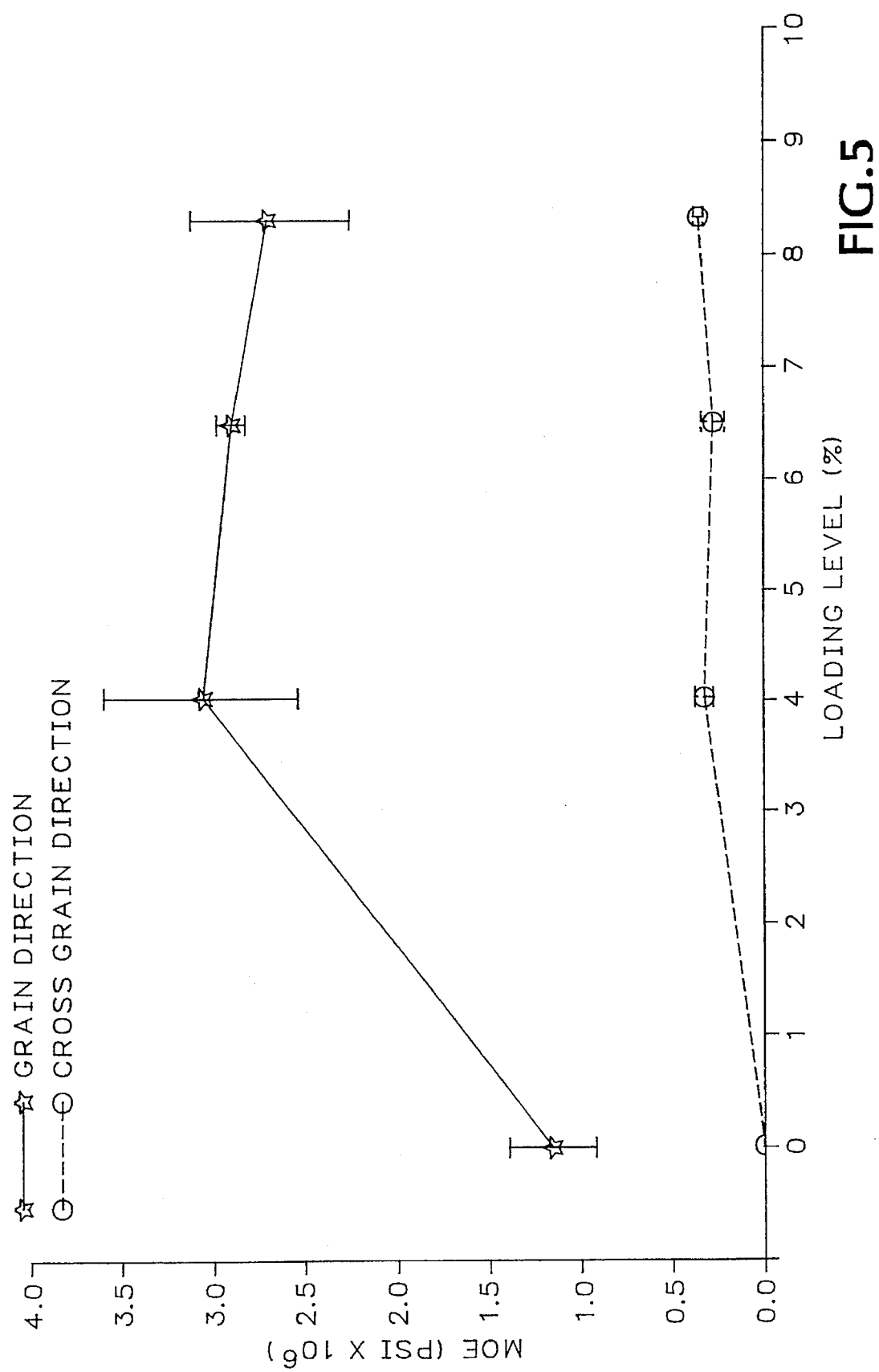
FIG. 5 is a plot of data from Example 9 showing the relationship of bending MOE, in the grain direction and in the cross-grain direction, to resin loading level in a veneer treated according to the present invention.
Figure 6:
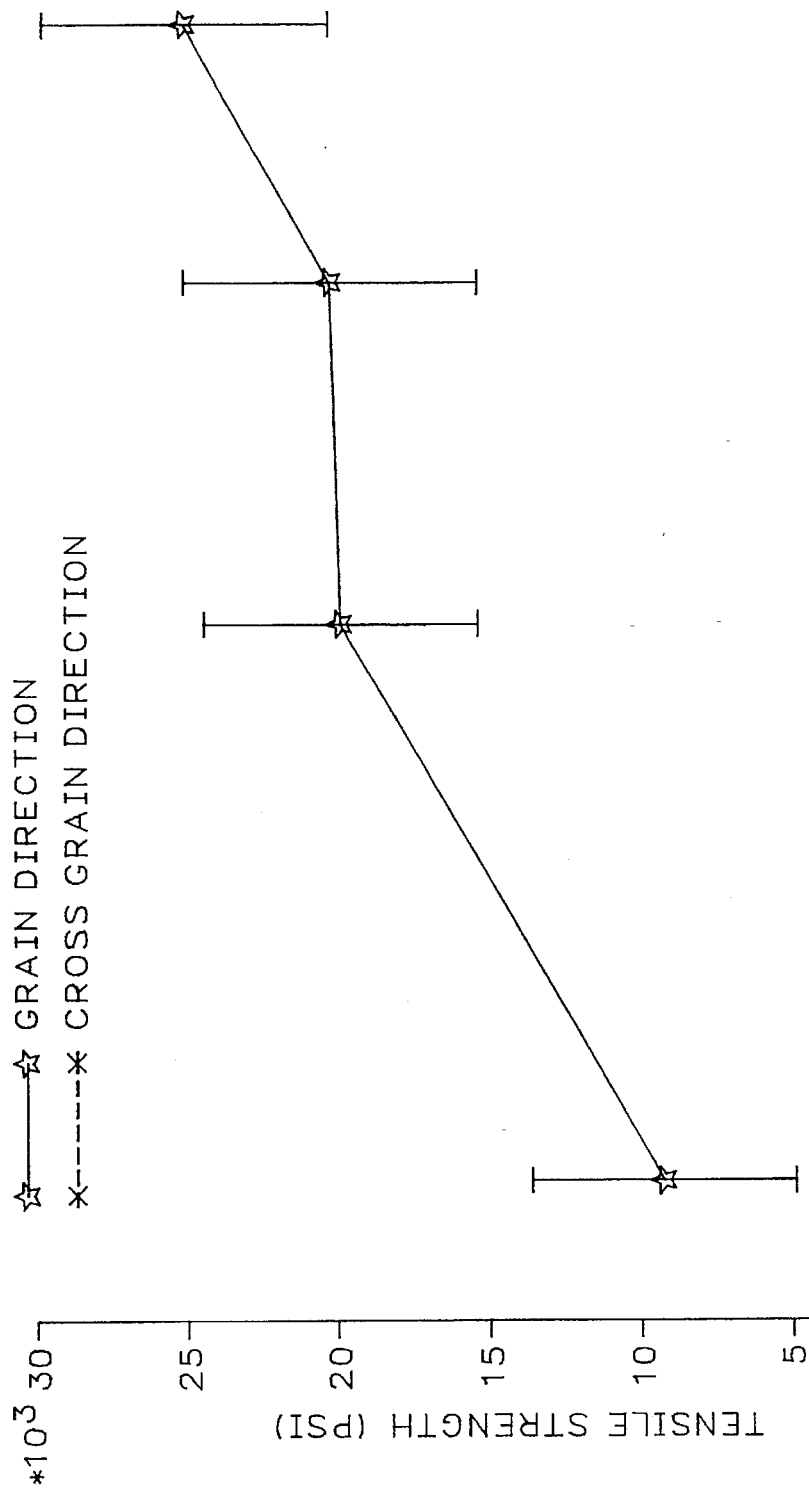
FIG. 6 is a plot of data from Example 9 showing the relationship of tensile strength, in the grain direction and in the cross-grain direction, to resin loading level in a veneer treated according to the present invention.
Figure 7:
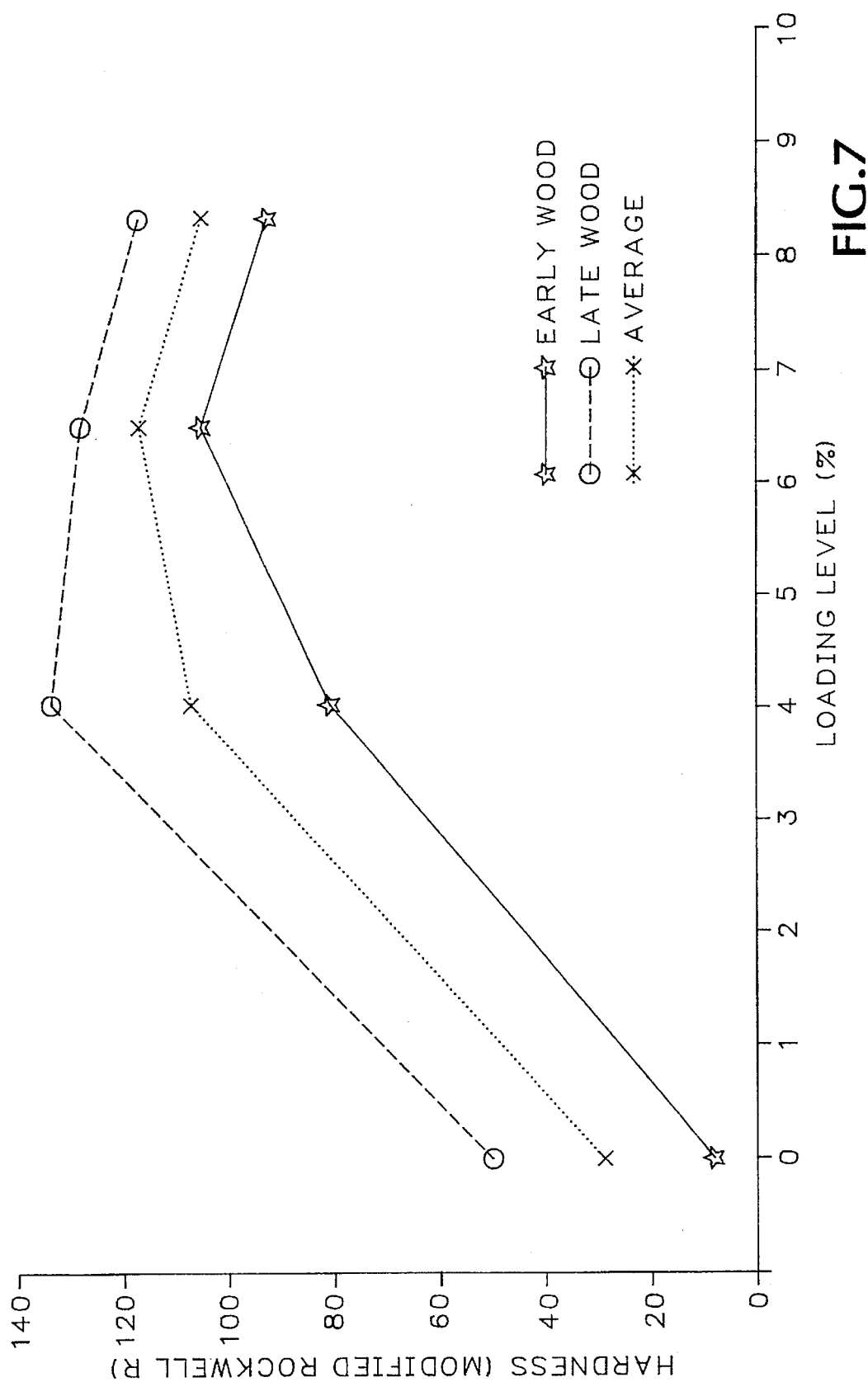
FIG. 7 is a plot of data from Example 9 showing the relationship of veneer hardness to resin loading level in various veneers treated according to the present invention.
Figure 8:
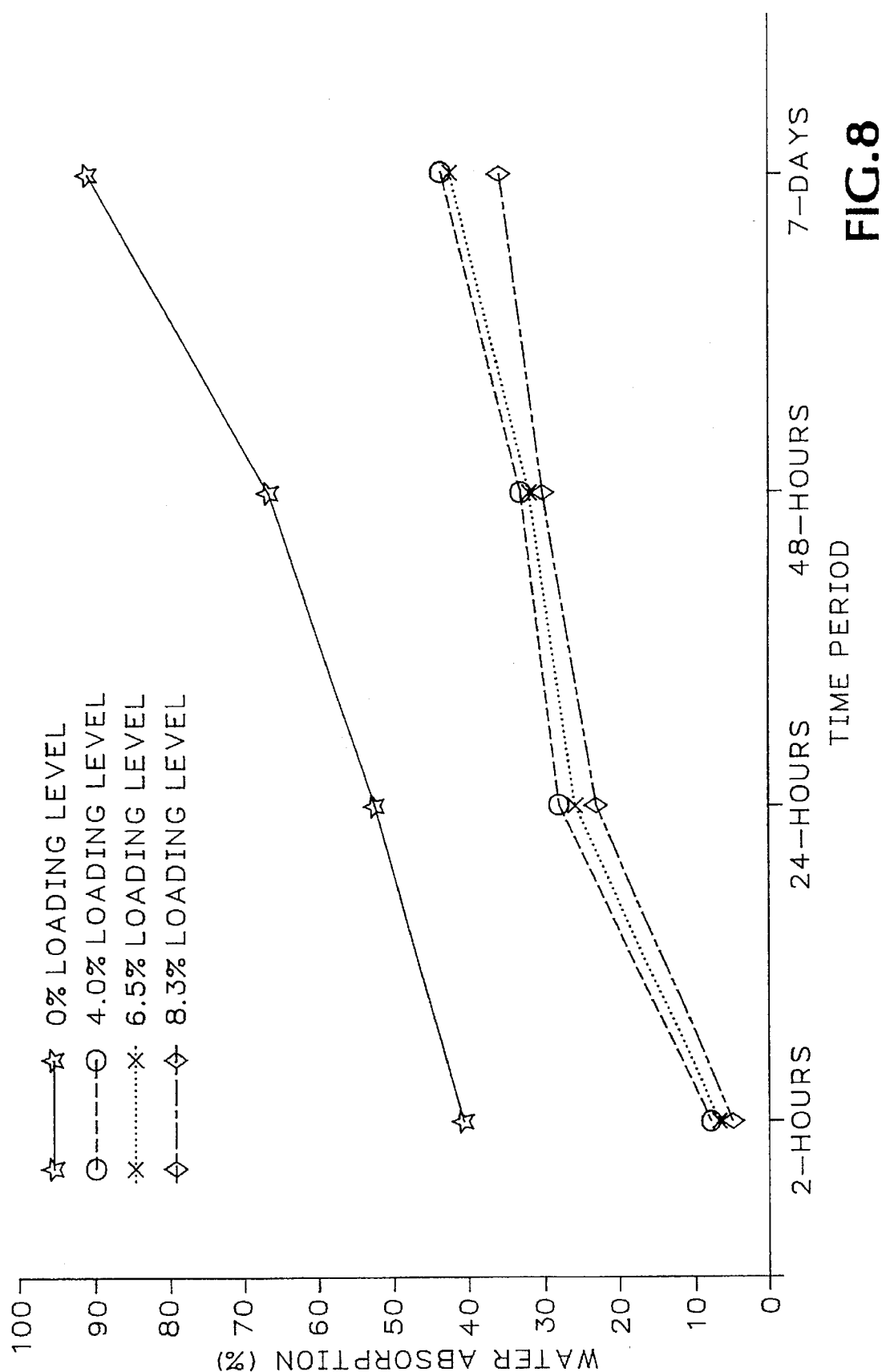
FIG. 8 is a plot of data from Example 9 showing water absorption by veneers treated according to the present invention with various loading levels of a polyisocyanate resin, compared to a control veneer containing no resin.

As shown in FIGS. 5–7, stiffness, tensile strength, and hardness of samples with 4-percent loading levels were all substantially increased compared to the untreated control, particularly in the grain direction but also in the normally relatively weak cross direction. With the exception of tensile strength, no improvement in properties was seen in samples having loading levels greater than 4 percent. Water absorption was consistently about half that of untreated controls (FIG. 8).

EXAMPLE 10

This Example was an investigation of properties of six veneers treated with polyisocyanate resin at loading levels of less than 5 percent but with varying degrees of compaction. The veneers were of southern yellow pine (nominally 12×12×⅛ inch). To obtain control values, the initial thickness, density, and MOE of each veneer were determined. Polyisocyanate resin was applied to both major surfaces at an average loading level of 3.75 percent (range: 3.2 to 4.6 percent). After application of the resin, the veneers were subjected to one of three different degrees of compaction: about 5% reduction in thickness, about 20% reduction in thickness, and about 40% reduction in thickness. Compaction/curing temperature was 370° F. for 60 seconds. After curing, the treated veneers were soaked in water at about 50° F. for 24 hours. Then, thickness, density, and bending MOE measurements were repeated. Results are set forth in Table 7.

TABLE 7

| Sample | Thickness Reduce | Density Increase | MOE Increase |
|---|---|---|---|
| 1 | 5% | 8.28% | 7% |
| 2 | 5% | 5.63% | 15% |
| 3 | 20% | 24.01% | 60% |
| 4 | 20% | 21.07% | 44% |
| 5 | 40% | 30.66% | 23% |
| 6 | 40% | 31.48% | 27% |

As can be ascertained from Table 7, a 20-percent compaction of these veneers resulted in the greatest percentage increases in stiffness. The 40-percent compaction appeared to be excessive, probably causing excess flattening and/or disintegration of the wood cells; this is indicated by the substantially lesser stiffness increase at 40-percent compaction relative to the stiffness increase at 20-percent compaction. The 44- to 60-percent increase in stiffness exhibited by veneers compacted 20 percent is somewhat low; this indicates that the loading level in these veneers is lower than an optimal loading level.

EXAMPLE 11

This Example is an investigation of the effect of the initial stiffness of a veneer on the stiffness obtainable after treating the veneer according to the present invention.

Figure 9:
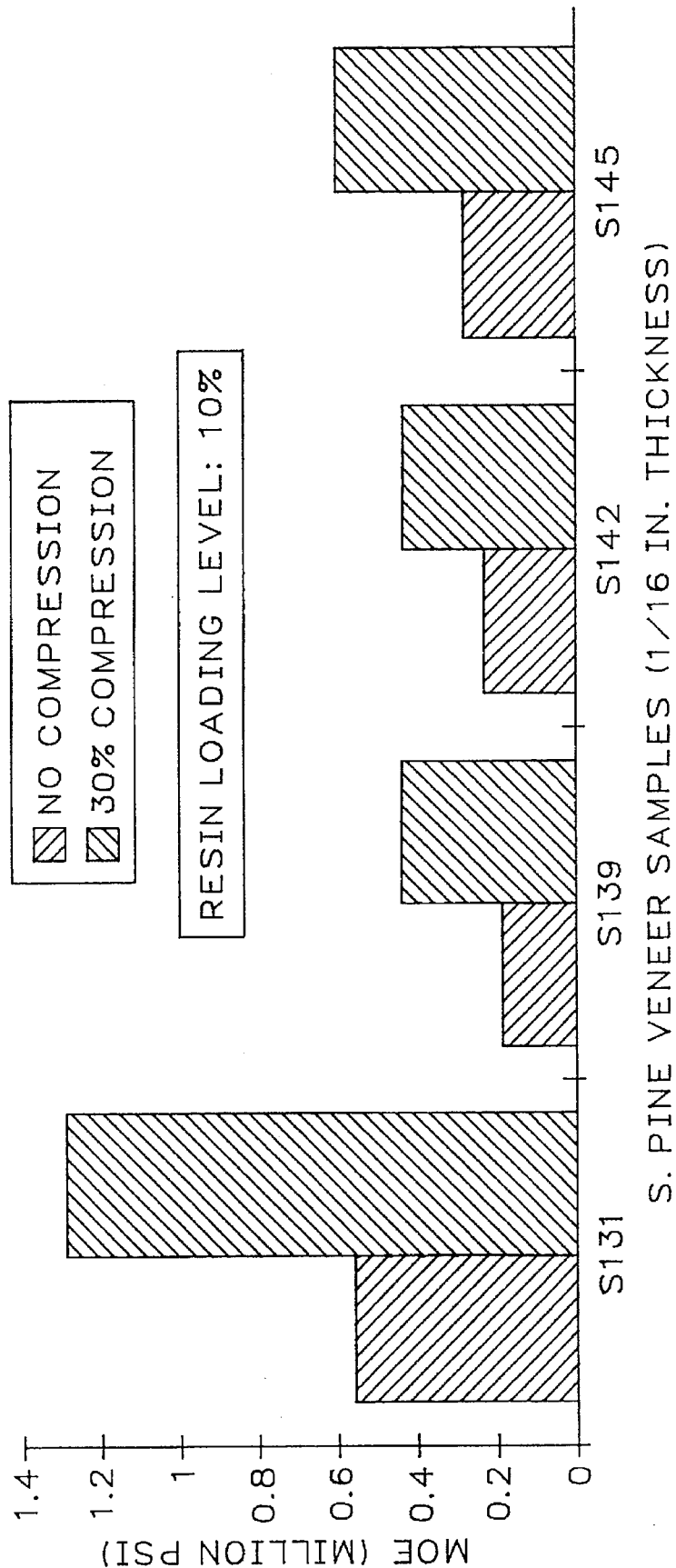
FIG. 9 is a bar graph of data from Example 11 showing the effect of 10% polyisocyanate loading, with 30% compaction, on various ⅙-inch thick veneers treated according to the present invention.

Four southern yellow pine veneers nominally measuring 12×12×⅙ inch were evaluated. Initial bending MOE measurements were obtained for each veneer. As shown in FIG. 9, these initial MOE values were not the same for all the veneers. The veneers were then treated with polyisocyanate resin (10 percent loading level) and compacted 30 percent using a 370° F. press for 60 seconds. Bending MOE measurements were again performed on each veneer. As shown in FIG. 9, each veneer exhibited a stiffness increase of about 100% or more, relative to untreated values, as a result of the treatment. Thus, the "starting" stiffness (stiffness of the untreated veneer) determines the stiffness of the veneer after treatment. In other words, the treatment does not confer the same stiffness on each veneer so treated; rather, the treatment imparts a certain magnitude of stiffness increase, relative to the stiffness of the same untreated veneer.

EXAMPLE 12

This Example is an investigation of the effect of various degrees of densification on the percentage increase in stiffness in representative veneers treated according to the present invention.

Twelve veneers as described in Example 1 were tested. Initial bending MOE values were obtained for each veneer before treatment (each was about 800,000 psi). The veneers were treated with 10% loading of a high-viscosity polyisocyanate resin (PAPI 20) on both major surfaces, then compacted. The veneers were compacted so as to yield a range of compactions, from an increased densification of about 10 percent to about 45 percent. Compaction temperature was 370° F. for 60 minutes. Results are shown in FIG. 10.

Figure 10:
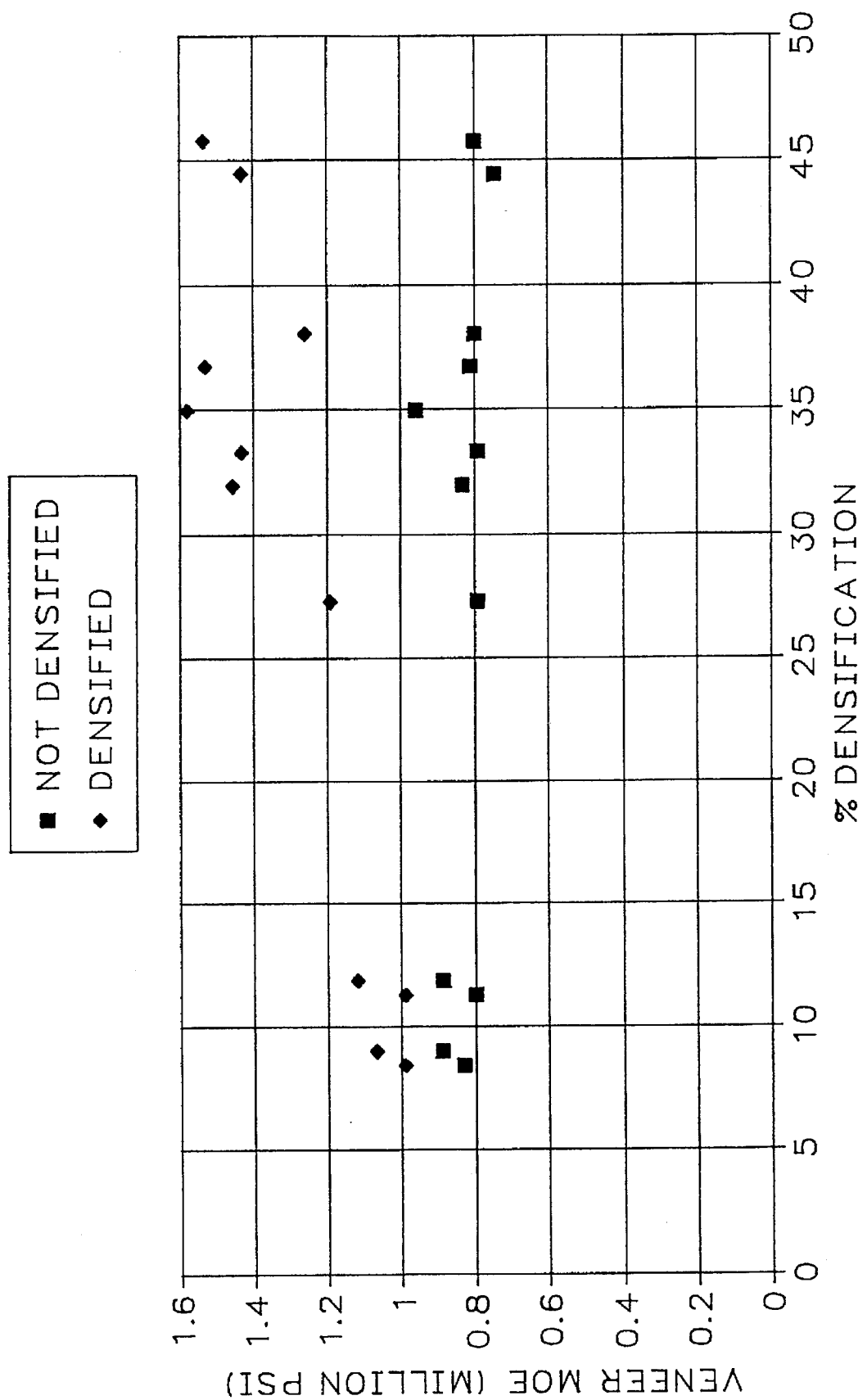
FIG. 10 sets forth data from Example 12 showing the relationship of the degree of densification (by compaction in the thickness dimension) to bending MOE of veneers treated according to the present invention, compared to untreated control veneers.

The FIG. 10 data indicate that, for these veneers, a 30-% densification yielded the maximal effect; exceeding 30-% densification did not produce a veneer exhibiting a bending MOE value significantly greater than the 1.5 million psi value produced by 30-percent compaction.

EXAMPLE 13

Figure 11:
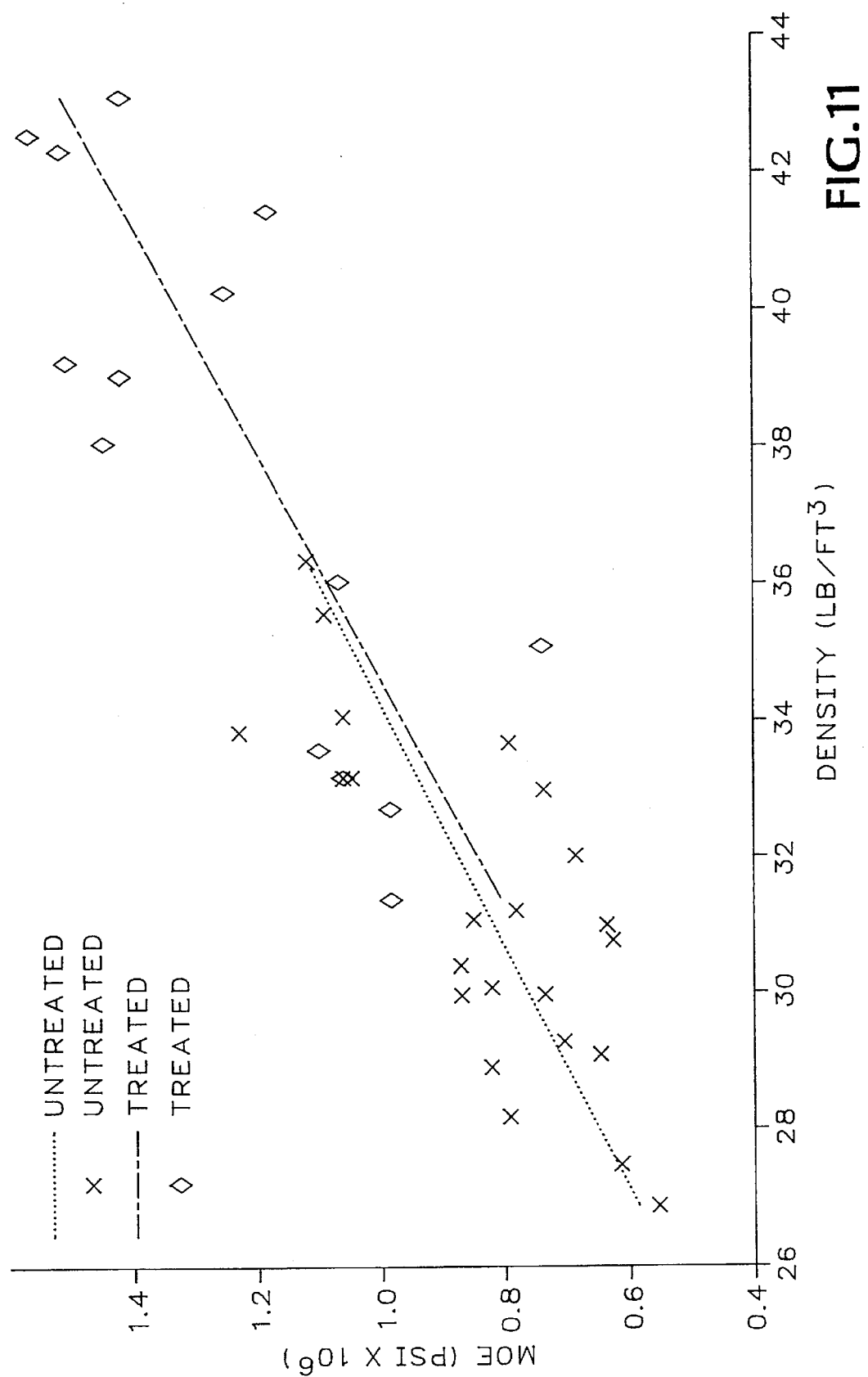
FIG. 11 is a plot of data from Example 13 showing bending MOE versus density of veneers treated according to the present invention, compared to untreated control veneers.

In this Example, the relationship of bending MOE versus density for various treated and untreated southern yellow pine veneers was investigated. FIG. 11 is a plot of the results obtained with a number of veneers, ranging from about 27 to about 36 lb/ft$^3$ for untreated veneers and about 31 to about 43 lb/ft$^3$ for treated veneers. As can be seen, the plots are substantially colinear, indicating that treatment according to the present invention essentially increases the MOE of a veneer in a linear fashion as a function of the density. These results indicate further that the cured resin does not contribute substantially to the increase in stiffness; rather, the strength enhancement exhibited by treated veneers is a result of increasing the density of the veneer. The polymer simply maintains the increased density imparted by compaction.

EXAMPLE 14

In this Example, a phenolic resin was used to maintain compaction of sample veneers. Comparisons were made between such veneers and veneers treated with polyisocyanate resin. Phenolic resins are quite different chemically from polyisocyanate resins. Furthermore, phenolic resins would be expected to penetrate the walls of the wood cells as well as bind wood cells together. The particular phenolic employed in this Example was obtained from Nestle and had a viscosity 250 cps. The resin was applied to ⅛-inch thick southern pine veneer sheets (12×12 inches) at loading levels of 4 percent to 8.6 percent. Compaction/curing was conducted at 330° F. to 370° F. and 500 psi for one to two minutes.

Bending MOE measurements were performed before treatment and after the treated veneers were soaked in water (about 50° F.) for 24 hours. Post-soak bending MOE measurements were determined as a percent improvement over the corresponding untreated veneers.

The phenolic resin imparted an improvement in MOE of 12 to 16 percent, compared to improvements of 50 to 60 percent exhibited by similar veneers treated in a similar manner with polyisocyanate resin.

While the invention has been described in connection with preferred embodiments, it will be understood that the invention is not limited to those embodiments. On the contrary, it is intended to cover all alternatives, modifications, and equivalents as may be included within the spirit and scope of the invention as defined by the appended claims.

What is claimed is:

1. A wood product enhanced in stiffness, the wood product comprising:
    a wood veneer having a length dimension, a width dimension, and a thickness dimension, the veneer being treated so as to have a population of compacted wood cells, the population of compacted wood cells extending across at least a portion of the length and width dimensions and into the thickness dimension of the treated veneer so as to confer an increased density on, and thus a correspondingly increased stiffness to, the treated veneer compared to an otherwise similar but not treated control veneer, the treated veneer including a loading level of a cured rigid thermoset material interspersed throughout the population of compacted wood cells, the loading level being sufficient to maintain compaction of said cells without saturating the compacted cells with the thermoset material, thereby conferring on the treated veneer an increased density and stiffness relative to the control veneer.

2. A wood product as recited in claim 1 wherein the population of compacted wood cells extends across the length and width dimensions of the veneer.

3. A wood product as recited in claim 1 wherein the thermoset material is polyurea.

4. A wood product as recited in claim 1 wherein the loading level is 2% to 20% w/w relative to a dry mass of the wood veneer.

5. A wood product as recited in claim 1 having a density that is up to 30% percent greater than the otherwise similar but not treated control veneer.

6. A wood product as recited in claim 5 that substantially maintains its increased density, even after soaking in water.

7. A wood product as recited in claim 1 wherein the treated veneer has first and second major surfaces, and both the major surfaces of the treated veneer include a population of compacted cells, each population including the loading level of the cured thermoset material.

8. A wood product as recited in claim 1 wherein the treated veneer has a bending MOE value that is at least 10 percent greater than a bending MOE value of the otherwise similar but not treated control veneer.

9. A laminated veneer lumber comprising multiple veneer plies superposedly adhered together, wherein at least one ply is a treated veneer as recited in claim 1.

10. A laminated veneer lumber as recited in claim 9 comprising inner plies and outer plies, wherein at least one outer ply is a treated ply.

11. A plywood comprising multiple veneer plies superposedly adhered together, wherein at least one ply is a treated veneer as recited in claim 1.

12. A plywood as recited in claim 11 comprising inner plies and outer plies, wherein at least one outer ply is a treated ply.

13. A wood product enhanced in strength and stiffness, the wood product comprising:

a wood veneer having first and second major surfaces and a thickness dimension, the veneer being treated so as to have a stratum of compacted wood cells, the stratum extending across at least a portion of a major surface and into the thickness dimension of the treated veneer so as to confer an increased density on, and thus a correspondingly increased strength and stiffness to, the treated veneer compared to an otherwise similar but not treated control veneer, the treated veneer including a loading level of a cured rigid thermoset material interspersed in the compacted wood cells of the stratum, the loading level being sufficient to maintain compaction of the compacted cells without saturating the compacted cells with the thermoset material, thereby conferring on the treated veneer an increased density, strength, and stiffness relative to the control veneer.

14. A wood product as recited in claim 13 comprising a stratum of compacted wood cells on each of the first and second major surfaces of the wood veneer.

15. A wood product enhanced in strength and stiffness, the wood product comprising:

(a) a wood veneer having first and second major surfaces across which extend length and width dimensions of the veneer, and a thickness dimension, the wood veneer being compacted, up to a maximal degree, in the thickness dimension, the maximal degree representing an amount of compaction above which the veneer would not exhibit an incremental increase in strength or stiffness with a corresponding increase in compaction; and (b) the wood veneer including a surficial stratum of compacted cells extending across a major surface of the veneer and extending into the thickness dimension, the compacted cells having interspersed thereamong a loading level of a cured thermoset material, the loading level being sufficient to maintain compaction of the cells in the stratum without saturating the compacted cells with the thermoset material, thereby conferring on the veneer an increased strength and stiffness relative to a an otherwise similar but not treated control veneer.

16. A laminated veneer lumber (LVL) product, comprising a lay-up of multiple veneer plies, each veneer ply having a thickness dimension and first and second major surfaces, wherein adjacent major surfaces of adjacent veneer plies of the LVL product are adhered to each other to form the LVL product;

at least one veneer ply being treated so as to have a population of wood cells, extending across at least one major surface of the veneer ply and extending into the thickness dimension of the veneer ply, that are permanently compacted so as to confer an increased density and thus an increased strength and stiffness to the treated veneer ply compared to an otherwise similar but untreated control veneer ply, and thereby confer an increased density and thus an increased strength and stiffness to the LVL product compared to an otherwise similar LVL made entirely from untreated veneer plies.

17. An LVL product as recited in claim 16, wherein the treated veneer ply has a density that is about 5 to about 30 percent greater than an otherwise similar but not treated veneer ply.

18. An LVL product as recited in claim 16, wherein the treated veneer ply has a bending MOE value that is at least 10 percent greater than an otherwise similar but not treated veneer ply.

19. An LVL product as recited in claim 16 having first and second major surfaces, wherein a treated veneer ply is situated on at least one of said major surfaces of the LVL product.

20. An LVL product as recited in claim 19, wherein the LVL product comprises multiple treated veneer plies, and wherein a treated veneer ply is situated on each of the first and second major surfaces of the LVL product.

21. An LVL product as recited in claim 16 having a cross-sectional profile suitable for use of the LVL product as construction lumber.

22. An engineered joist comprising an LVL product as recited in claim 16.

23. A plywood product, comprising a lay-up of multiple veneer plies, each veneer ply having a thickness dimension and first and second major surfaces, wherein adjacent major surfaces of adjacent veneer plies of the plywood product are adhered to each other to form the plywood product;

at least one veneer ply being treated so as to have a population of wood cells, extending across at least one major surface of the veneer ply and extending into the thickness dimension of the veneer ply, that are permanently compacted so as to confer an increased density and thus an increased strength and stiffness to the treated veneer ply compared to an otherwise similar but untreated control veneer ply, and thereby confer an increased density and thus an increased strength and stiffness to the plywood product compared to an otherwise similar plywood made entirely from untreated veneer plies.

24. A plywood product as recited in claim 23, wherein the treated veneer ply has a density that is about 5 to about 30 percent greater than an otherwise similar but not treated veneer ply.

25. A plywood product as recited in claim 23, wherein the treated veneer ply has a bending MOE value that is at least 10 percent greater than an otherwise similar but not treated veneer ply.

26. A plywood product as recited in claim 23 having first and second major surfaces, wherein a treated veneer ply is situated on at least one of said major surfaces of the plywood product.

27. A plywood product as recited in claim 26, comprising multiple treated veneer plies, wherein a treated veneer ply is situated on each of the first and second major surfaces of the plywood product.

28. A method of producing a compacted springback-resistant wood veneer, the veneer having a major surface, the method comprising:

(a) compacting at least a portion of a major surface of the veneer;

(b) impregnating at least a portion of the compacted portion of the major surfaces of the veneer with a liquid thermosettable resin at a loading level which does not saturate the veneer; and (c) curing the resin while the compacted portion of the veneer is maintained compacted, so as to form a cured resin that causes the impregnated compacted portion of the major surface to resist springback.

29. A method according to claim 28 wherein, in step (b), the loading level is within a range of 2 to 20 percent w/w.

30. A method for producing a wood product having enhanced strength and stiffness levels, the method comprising:

(a) providing a wood veneer comprising wood cells, the veneer having first and second major surfaces across which extend length and width dimensions of the veneer, a thickness dimension, a first density level, a first strength level, and a first stiffness level;

(b) applying to at least one major surface of the veneer a liquid thermosettable resin capable of being absorbed into the wood cells and capable of being cured to form a rigid thermoset material, wherein the resin is applied to the major surface at a loading level within a range of L1 to L2 shown in FIG. 1;

(c) compacting the veneer in the thickness dimension so as to cause wood cells into which the resin has absorbed to undergo a deformation sufficient to reduce the thickness dimension and thus densify the veneer to a level above the first density level and cause increases in strength and stiffness of the veneer to levels above the first strength and stiffness levels, respectively; and (d) while maintaining compaction of the veneer, curing the resin applied to the veneer to form the resin into a rigid thermoset material capable of retaining compaction of the veneer.

31. A method as recited in claim 30 wherein the liquid thermosettable resin comprises a polyisocyanate compound.

32. A method as recited in claim 31 wherein the polyisocyanate compound comprises PMDI.

33. A method as recited in claim 32 wherein the moisture level is stoichiometric relative to the loading level of the polyisocyanate compound.

34. A method as recited in claim 30 wherein, in step (b), the resin is applied to the veneer using a roller coater.

35. A strength-enhanced wood product made according to the method recited in claim 30.

36. A method for producing a wood product having enhanced strength and stiffness levels, the method comprising:

(a) providing a wood veneer comprising wood cells, the veneer having first and second major surfaces across which extend length and width dimensions of the veneer, a thickness dimension, a first density level, a first strength level, and a first stiffness level;

(b) applying to at least one major surface of the veneer a liquid thermosettable resin capable of being absorbed into the wood cells and capable of being cured to form a rigid thermoset material, wherein the resin is applied to the major surface at a loading level sufficient to penetrate into the thickness dimension no more than about 10 cells deep without saturating the veneer with resin;

(c) compacting the veneer in the thickness dimension so as to cause wood cells into which the resin has absorbed to undergo a deformation sufficient to reduce the thickness dimension and thus densify the veneer to a second density level above the first density level and cause increases in strength and stiffness of the veneer to levels above the first strength and stiffness levels, respectively; and (d) while maintaining compaction of the veneer, curing the resin applied to the veneer to form the resin into a rigid thermoset material capable of retaining compaction of the veneer.

37. A strength-enhanced wood product made using the method recited in claim 36.

38. A method for producing a strength-enhanced wood product, the method comprising:

(a) providing a wood veneer comprising wood cells, the veneer having first and second major surfaces across which extend length and width dimensions of the veneer, and a thickness dimension, the veneer having a capability of being compacted, up to a maximal degree, in the thickness dimension so as to form a surficial stratum of compacted wood cells on at least one major surface and extending to a depth into the thickness dimension, the maximal degree of compaction representing an amount of compaction above which the veneer would not exhibit an incremental increase in strength with a corresponding increase in compaction;

(b) applying to a major surface of the veneer a liquid thermosettable resin capable of being absorbed into the wood cells of the veneer and capable of being cured to form a rigid thermoset material, wherein the resin is applied at a non-saturating loading level sufficient for the resin to penetrate from the major surface into the thickness dimension no more than the depth of the surficial stratum that would be formed if the veneer were compacted at the maximal degree;

(c) allowing the resin to penetrate into the veneer;

(d) compacting the veneer in the thickness dimension an amount no greater than the maximal degree so as to form the surficial stratum of compacted cells on the major surface and thereby reduce the thickness dimension of the veneer; and (e) while maintaining compaction of the veneer, curing the resin applied to the veneer to form the resin into a rigid thermoset material capable of retaining compaction of the veneer.

39. A method as recited in claim 38 wherein the maximal degree of compaction represents a reduction of the thickness dimension of the veneer of no greater than 30 percent.

40. A method as recited in claim 38 wherein the thermosettable resin comprises a polyisocyanate compound.

41. A method as recited in claim 40 wherein the loading level is within a range of about 2% to about 20%.

42. A method as recited in claim 38 wherein step (e) is performed at a temperature within a range of about 250° F. to about 400° F.

43. A strength-enhanced wood product made using a method as recited in claim 38.

* * * * *

UNITED STATES PATENT AND TRADEMARK OFFICE
CERTIFICATE OF CORRECTION

PATENT NO : 5,652,065
DATED : July 29, 1997
INVENTOR(S): David W. Park, Frank R. Hunter, Alkiviadis G. Dimakis It is certified that error appears in the above-identified patent and that said Letters Patent are hereby corrected as shown below:

Column 1, line 16, after "denser" please add --wood than younger trees as a result of a generally--

Column 6, line 53, "Candidate" should begin a new paragraph.

Column 7, line 13, "significasignificant" should read --significant--.

Column 11, line 20, "penetrainon" should read --penetration--.

Signed and Sealed this

Seventeenth Day of February, 1998

*Attest:*

BRUCE LEHMAN

*Attesting Officer*      Commissioner of Patents and Trademarks